(12) United States Patent
Kim et al.

(10) Patent No.: US 12,019,977 B2
(45) Date of Patent: Jun. 25, 2024

(54) FAST FILL FOR COMPUTERIZED DATA INPUT

(71) Applicant: Rubrik, Inc., Palo Alto, CA (US)

(72) Inventors: Joo Hee Kim, Redwood City, CA (US); Oded Klimer, San Jose, CA (US); Mukul Chandra Singh Bisht, Pleasanton, CA (US)

(73) Assignee: Rubrik, Inc., Palo Alto, CA (US)

( * ) Notice: Subject to any disclaimer, the term of this patent is extended or adjusted under 35 U.S.C. 154(b) by 131 days.

(21) Appl. No.: 17/650,179

(22) Filed: Feb. 7, 2022

(65) Prior Publication Data

US 2023/0252229 A1 Aug. 10, 2023

(51) Int. Cl.
*G06F 40/174* (2020.01)
*G06F 3/04842* (2022.01)
*G06F 40/177* (2020.01)

(52) U.S. Cl.
CPC ........ *G06F 40/174* (2020.01); *G06F 3/04842* (2013.01); *G06F 40/177* (2020.01)

(58) Field of Classification Search
None
See application file for complete search history.

(56) References Cited

U.S. PATENT DOCUMENTS

| | | | |
|---|---|---|---|
| 10,437,428 B2 * | 10/2019 | Callaghan | G06F 3/0484 |
| 10,489,032 B1 * | 11/2019 | Margolin | G06F 21/6245 |
| 2007/0050697 A1 * | 3/2007 | Lewis-Bowen | G06F 40/18 715/212 |
| 2007/0266331 A1 * | 11/2007 | Bicker | G06F 40/177 715/764 |
| 2011/0202823 A1 * | 8/2011 | Berger | G06F 40/18 715/217 |
| 2015/0286625 A1 * | 10/2015 | Escarguel | G06F 16/156 715/220 |
| 2016/0275066 A1 * | 9/2016 | Otero | G06F 3/04842 |
| 2018/0341371 A1 * | 11/2018 | Callaghan | G06F 40/177 |
| 2019/0042325 A1 * | 2/2019 | Nair | H04L 43/20 |

* cited by examiner

*Primary Examiner* — Howard Cortes
(74) *Attorney, Agent, or Firm* — Holland & Hart LLP

(57) ABSTRACT

A method of data input via a user interface is described. According to the method, a set of input fields may be provided at the user interface which correspond to respective columns or to respective rows of a data table. A data input may be received at the user interface within an input field of the set of input fields which corresponds to a first column or to a first row of the data table. An applicability indication may then be received at the user interface which indicates that the data input is applicable to a subset of the rows or a subset of the columns. Based on receiving the data input within the input field and based on the applicability indication, multiple instances of the data input may be applied to the data table.

20 Claims, 16 Drawing Sheets

FAST FILL FOR COMPUTERIZED DATA INPUT

FIELD OF TECHNOLOGY

The present disclosure relates generally to data input for computing systems and related user interfaces and data processing, and more specifically to fast fill for computerized data input.

BACKGROUND

Many computing systems may operate on large quantities of data. For example, a data management system may be a computing system employed to manage, process, backup, and restore data using a network of computing devices, and some data management systems may implement relatively large quantities of user data that is stored and applied across various aspects of the system.

Whether for data management systems or other types of computing systems, a user of a computing system may sometimes have to input large quantities of data (e.g., via a user interface). Existing solutions by which a user may input data into a computing system may be deficient.

DETAILED DESCRIPTION

Figure 1:
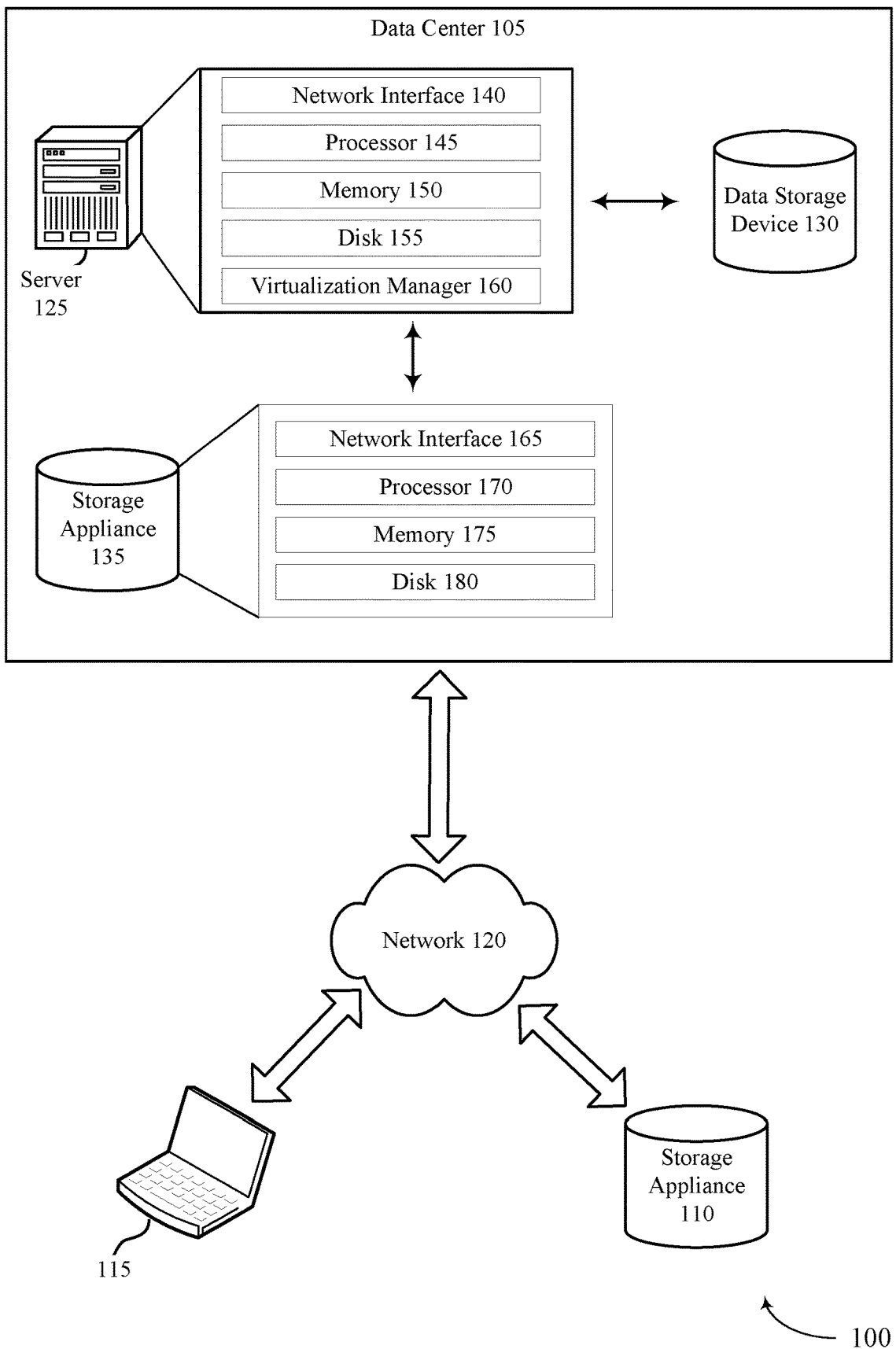
FIG. 1 illustrates an example of a computing environment that supports fast fill for computerized data input in accordance with aspects of the present disclosure.

In many computing scenarios, a user may have a quantity of data to manually enter into a data table at a user interface. In some cases, however, such manual entry of data to columns or rows of a data table may take time, require high effort from the user, and may be generally inefficient—especially when at least some of the data inputs are repetitive across rows or columns of the data table, thereby causing the user to enter data inputs with identical values (e.g., identical content) into multiple corresponding columns or rows of the data table. Such inefficiencies may increase as the size of a data table increases, the quantity of repetitive data inputs increases, or both. Additionally or alternatively, the manual entry of data may be particularly vulnerable to errors as the number of repetitive entries performed by the user increases.

To reduce the amount of time it takes for a user to complete the entry of data inputs into a data table having multiple repeated entries, the user may employ a "fast fill" procedure as described herein, which may allow the user to enter information (e.g., a data input with a value corresponding to multiple input fields within a row or column of the data table) once, and then use the fast fill procedure to bulk-apply the entered information to multiple input fields within a row or column of the data table based on directions given from the user.

For example, the user may select a fast fill icon at a user interface to use (e.g., initiate) the fast fill procedure. One or more fast fill input fields each corresponding to a respective column of the data table may be provided to the user. The user may enter data only once for a given column, into the corresponding fast fill input field, and the data may then be replicated within the column of the table across all rows or across some subset of rows (e.g., a subset of rows as manually selected by the user or based on some criteria indicated by the user), such that an identical data input is generated for each applicable row. Fast fill input fields may be provided for some or all columns of the table. Additionally or alternatively, fast fill input fields may be provided for some or all rows of the table (e.g., to allow identical inputs to be generated within a row of the table across some or all columns of the table). Further, multiple different fast fill inputs may be applied to a different subset of rows or columns within the same column or row, based on different applicability indications for the different fast fill inputs.

The fast fill input fields may be provided within a same application, same interface, or both as the corresponding data table. This may, for example, allow a user to perform efficient entry of repetitive data without having to access a separate application or separate interface. Accordingly, the fast fill procedure may reduce the total number of steps taken by the user to enter the data.

Although the fast fill procedure may be implemented for a number of different applications in which a user has a relatively large quantity of data to enter into a data table, one possible example of the fast fill procedure may include processes for entering configuration information for a large number of virtual machines (VMs) into a user interface, where each VM may correspond to a different row of a table and each column may correspond to a different configuration parameter, with one or more of the configuration parameters having common values across multiple VMs.

Aspects of the disclosure are initially described in the context of an environment supporting an on-demand database service. Aspects of the disclosure are further described with reference to a computing environment illustrating communications that support fast fill for computerized data input. Aspects of the disclosure are further illustrated by and described with reference to data input configurations, a user interface, apparatus diagrams, system diagrams, a process flow, and flowcharts that relate to that relate to fast fill for computerized data input.

FIG. 1 illustrates an example of a computing environment 100 for cloud computing that supports techniques for package injection for virtual machine configuration in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks. Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, networked computing environment 100 may provide remote access to secure applications and files stored within data center 105 from a remote computing device, such as computing device 115. In addition, the storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

As described herein, in some cases, a user may have a relatively large quantity of data (that includes configuration information for a large number of VMs) to enter into a user interface (e.g., a user interface at the computing device 115, for example) where each VM may correspond to a different row of a data table and each column may correspond to a different configuration parameter, with one or more of the configuration parameters having common values across multiple VMs. In some cases, some or all computing (e.g., processing) operations related to a fast fill procedure as described herein may be performed locally at the computing device 115 (e.g., autogenerating a set of fast fill input fields corresponding to a data table, identifying the applicability of fast fill inputs received via fast fill input fields, applying such fast fill inputs to a data table, among other possibilities). Additionally or alternatively, some or all computing (e.g., processing) operations related to a fast fill procedure as described herein may be performed remote from the computing device 115 (e.g., at server 125, a storage appliance 135, a storage appliance 110, or any combination thereof)— for example, a user interface may be provided (e.g., displayed) and user inputs may be received at the computing device 115, but one or more operations in support of the user interface and processing such user inputs may occur remote from the computing device 115.

Techniques described herein may support fast fill procedures for entering data such that a user may supply information for various devices of networked computing environment 100. The storage appliance 135 may be configured to receive configuration parameters (e.g., network configuration) associated with one or more virtual machines, as provided in one or more entries to a data table. for example, a user may employ the fast fill procedure to enter information regarding various virtual machines (e.g., a data input with a value corresponding to multiple input fields within a row or column of the data table) once, and then use the fast fill procedure to bulk-apply the entered information to multiple input fields within a row or column of the data table based on directions given from the user. For example, the user may select a fast fill icon at a user interface at the computing device 115 to use (e.g., initiate) the fast fill procedure. The user may enter different inputs of a row and these inputs may then be applied across a set of selected columns using the fast fill procedure. In such cases, the fast fill procedure may automatically fill in multiple input fields spanning multiple columns or rows based on a single input, thus saving time and effort for the user. The fast fill procedure may aid in data entry to configure virtual machines and thus support data backup for files stored at virtual machines.

It should be appreciated by a person skilled in the art that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
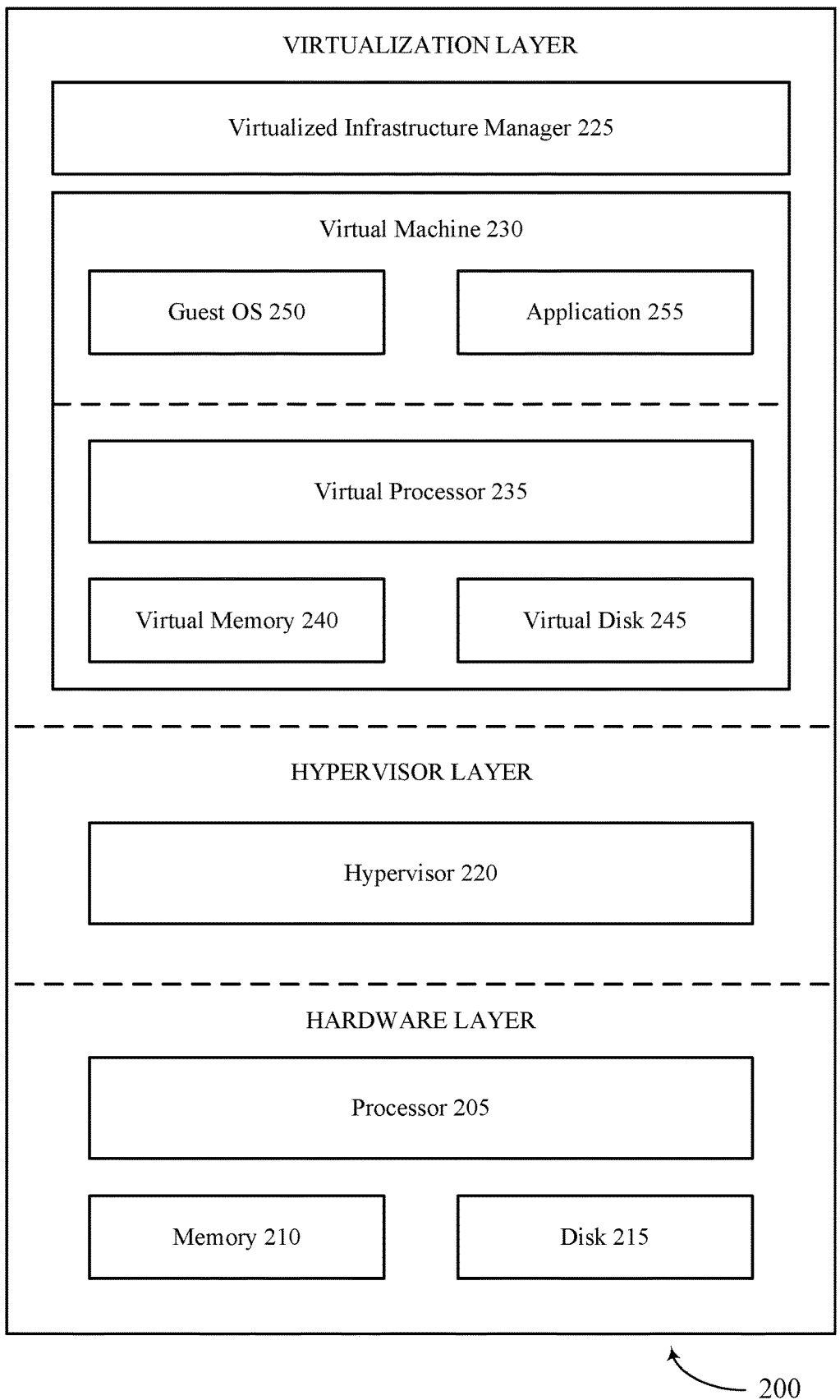
FIG. 2 illustrates an example of a server that supports fast fill for computerized data input in accordance with aspects of the present disclosure.

FIG. 2 illustrates an example of a server 200 that supports techniques for data retrieval using cryptographic signatures in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more virtual disks 245. In one example, a virtual machine 230 may include a plurality of virtual disks 245, with each virtual disk of the plurality of virtual disks 245 associated with a different file stored on the one or more virtual disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines.

The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, in some cases, the server 200 may support fast fill for computerized data input. For example, a user may have a data which specifies parameters for virtual machine 230 which is associated with a configuration for the server 200. In some cases, the fast fill procedure may allow a user to enter repetitive data regarding different parameters of the virtual machine 230 (and other VMs) to more efficiently configure the server for data storage and backup.

Figure 3:
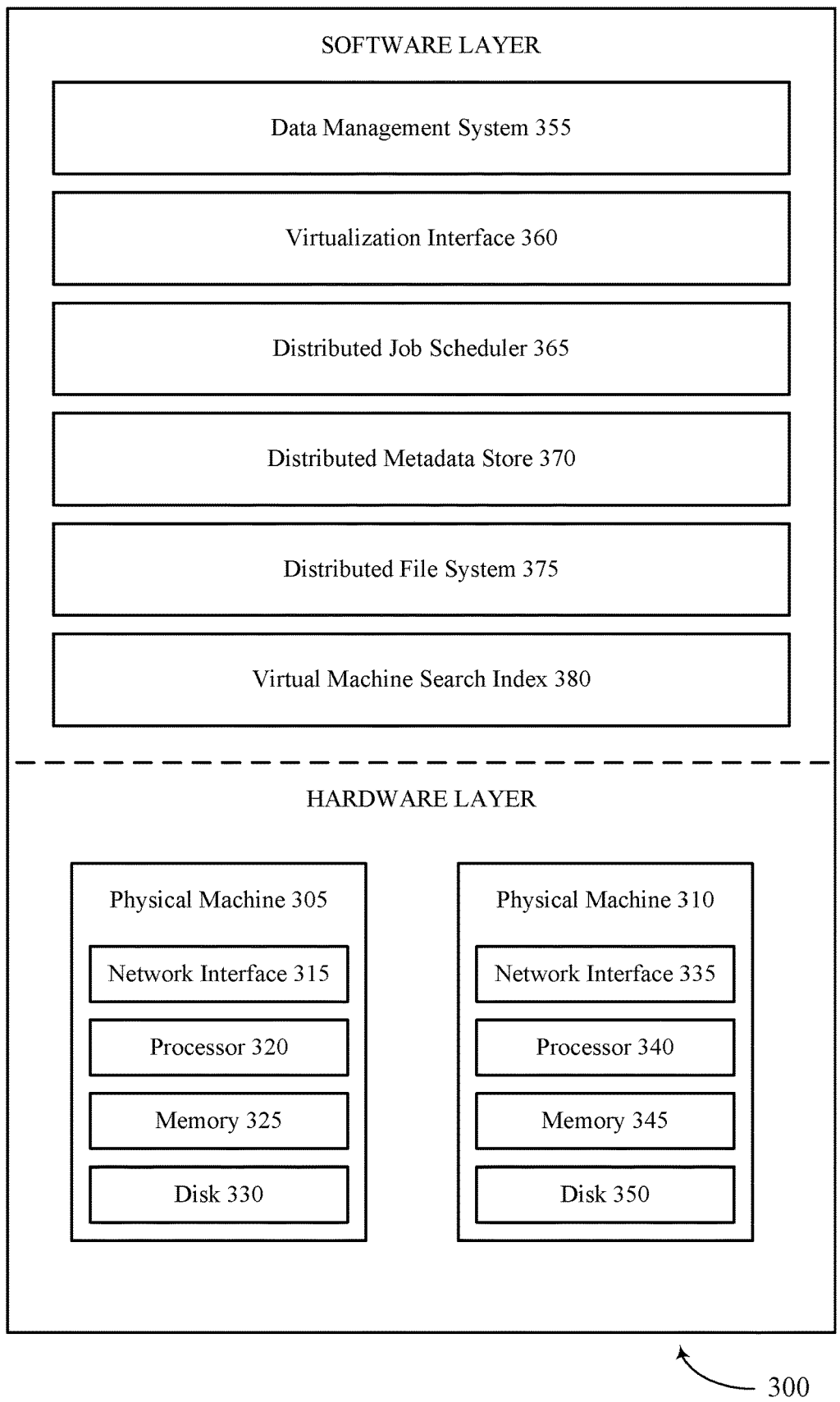
FIG. 3 illustrates an example of a storage appliance that supports fast fill for computerized data input in accordance with aspects of the present disclosure.

FIG. 3 illustrates an example of a storage appliance 300 that supports techniques for data retrieval using cryptographic signatures in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300 or server 200 may support fast fill for computerized data input. In some cases, the storage appliance 300 may manage virtual machines that are supported by physical machines 305 and 310. The cloud application may receive configuration parameters associated with the virtual machines, and the configuration parameters may include network configurations for the virtual machines. In some cases, data associated with these configuration parameters are to be manually entered by a user into a user interface for configuring a set of virtual machines. To reduce the amount of time it takes for a user to complete the entry of data inputs into a data table having multiple repeated entries, the user may employ a fast fill procedure as described herein, which may allow the user to enter information (e.g., a data input with a value corresponding to multiple input fields within a row or column of the data table) once, and then use the fast fill procedure to bulk-apply the entered information to multiple input fields within a row or column of the data table based on directions given from the user. For example, data may be associated with parameters associated stored at the virtual machine search index 380, or a number of other aspects of the storage appliance 300.

Figure 4:
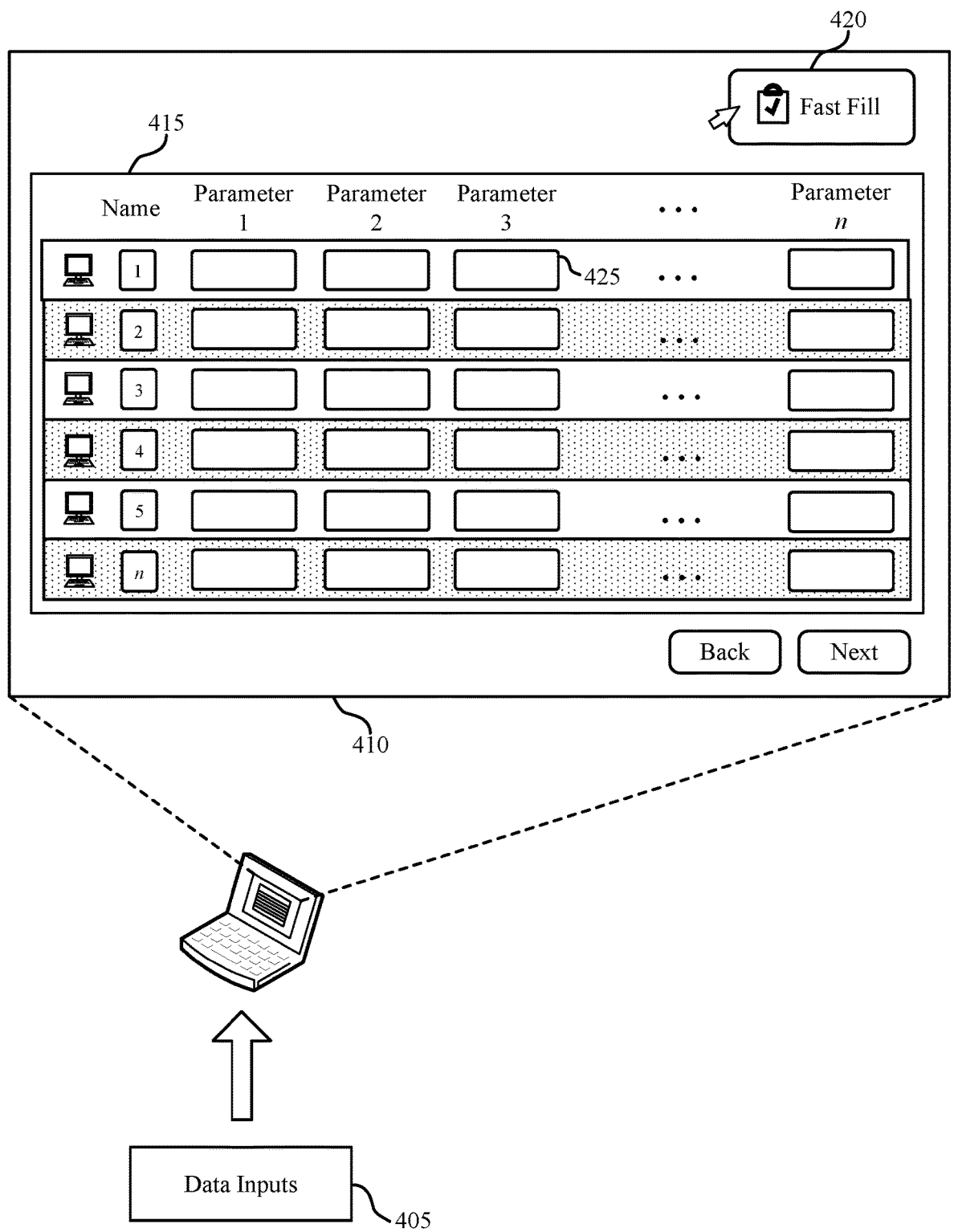
FIGS. 4 and 5 illustrate example data input configurations that support fast fill for computerized data input in accordance with aspects of the present disclosure.

FIG. 4 illustrates an example of a data input configuration 400 that supports fast fill for computerized data input in accordance with aspects of the present disclosure. The data input configuration 400 includes a user interface 410, and the user interface 410 may include a data table 415 along with a fast fill icon 420. In some examples, the data input configuration 400 may be implemented at a server 125, storage appliance 135, computing device 115, server 200, storage appliance 300, or any combination thereof as described with respect to FIGS. 1 through 3.

The data table 415 may include any quantity of input fields 425, which may be organized (e.g., arranged) into rows and columns. Thus, the data table 415 may include any quantity of rows and any quantity of columns. In the example illustrated in FIG. 4 and other examples described herein, each row of the data table 415 (e.g., each row of input fields 425) may correspond to a different computing system (e.g., virtual machine, database, or other type of computing system), and each column of the data table 415 (e.g., each column of input fields 425) may correspond to a different configuration parameter for the computing systems. For example, columns one through n of the data table 415 may respectively correspond to one or more of a target network, an internet protocol (IP) configuration, and IP address, an IP netmask, one or more domain name system (DNS) servers, gateway information, or any combination thereof (e.g., where each row of the data table 415 correspond to a different virtual machine). That is, in such an example, Parameter 1 of the data table 415 may be a target network parameter, Parameter 2 of the data table 415 may be an IP configuration parameter, and so on. It is to be understood, however, that the input fields 425 of the data table 415 may be for accepting data of any type and that the rows and columns of the data table 415 may likewise corresponds to data of any type.

In some implementations, a user may be tasked with inputting (e.g., entering) a relatively large quantity of data inputs 405 into a data table 415. The user may manually enter the data inputs 405 directly into the data table via the user interface 410 (e.g., via the input fields 425 of the user interface 410). Thus, in some examples, the user may enter data inputs 405 into the data table 415 by entering multiple data inputs 405 into each row. For example, the user may enter multiple data inputs 405 (e.g., separate values for each of parameter 1, parameter 2, parameter 3, through parameter n) corresponding to a given row (e.g., row 1 corresponding to computing system 1), and the user may repeat this process for some or all of the other rows (e.g., some or all of row 2, row 3, row 4, row 5, through row n). In some cases, however, such manual entry of data inputs 405 may take time, require high effort from the user, and may be generally inefficient—especially when at least some of the data inputs 405 are repetitive across rows or columns of the data table 415, thereby causing the user to enter data inputs 405 with identical values (e.g., identical content) into multiple corresponding columns or rows of the data table. For example, with reference to the example illustrated in FIG. 4, if the value of Parameter 2 is the same for each of computing systems 2, 4, and 5, then direct entry of the data inputs 405 into the data table 415 may require a user to enter a first data input 405 into a first input field 425 within the Parameter 2 column of row 2, enter a second data input 405 into a second input field 425 within the Parameter 2 column of row 4, and enter a third data input 405 into a third input field 425 within the Parameter 2 column of row 5—despite the first data input 405, the second data input 405, and the third data input 405 each having identical content (e.g., an identical value for Parameter 2). Such inefficiencies may be exacerbated as the size of a data table 415 increases, the quantity of repetitive data inputs 405 increases, or both.

To reduce the amount of time it takes for a user to complete the entry of data inputs 405 into a data table 415 having multiple repeated entries, the user may employ a "fast fill" procedure as described herein, which may allow the user to enter information (e.g., enter a data input 405 with a value corresponding to multiple input fields 425 within a row or column of the data table) once, and then use the fast fill procedure to bulk-apply the entered information to multiple input fields 425 within a row or column of the data table (e.g., all input fields 425 or to a subset of the input fields 425 within the row or column) based on directions given from the user. In the example illustrated in FIG. 4, the user may select the fast fill icon 420 to use (e.g., initiate) the fast fill procedure. The fast fill procedure may be flexible and scalable, and may be adapted to different sets of repetitive data organized in a tabular format. For example, a user may apply the fast fill procedure to automatically fill in multiple input fields 425 spanning multiple columns or rows based on a single input. In such cases, the fast fill eliminates user need to enter multiple data inputs 405 into multiple input fields 425, but may instead enter a single data input 405 and apply that single data input 405 across multiple columns or rows of the data table 415.

Additionally or alternatively, the fast fill procedure may be provided within a same application, same interface, or both as the corresponding data table—e.g., by including the fast fill icon 420 within the user interface 410 that includes the data table 415. This may, for example, allow a user to perform efficient entry of repetitive data without having to access a separate application or separate interface Accordingly, the fast fill procedure may reduce the total number of steps taken by the user to enter the data.

Figure 5:
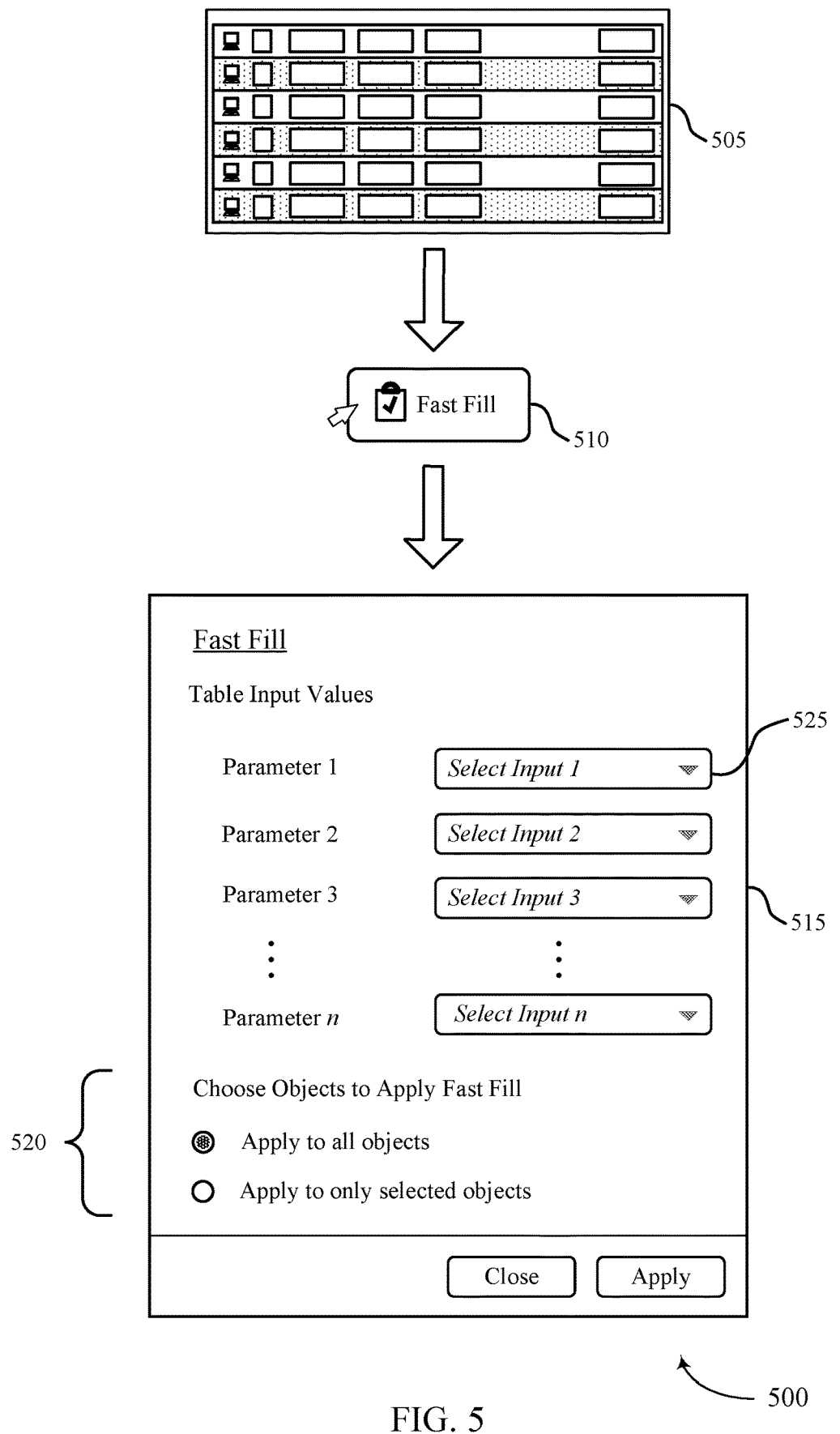

FIG. 5 illustrates an example of a data input configuration 500 that supports fast fill for computerized data input in accordance with aspects of the present disclosure. The data input configuration 500 includes a data table 505, a fast fill procedure 510, and form 515. The data table 505 may be an example of a data table 415 as described with reference to FIG. 4. In some examples, the data input configuration 500 may be implemented at a server 125, storage appliance 135, computing device 115, server 200, storage appliance 300, or any combination thereof as described with respect to FIGS. 1 through 3, and may be an extension of data input configuration 400 described with respect to FIG. 4.

The user may initiate a fast fill procedure 510, for example, by selecting a fast fill icon 420 as illustrated in FIG. 4. Based on initiating the fast fill procedure 510, a form 515 may be displayed to the user (e.g., via the user interface 410, as an overlay of the data table 415 or otherwise). In some cases, the form 515 may be generated (e.g., autogenerated) based on column objects or row objects existing in the data table 505. In some examples, these row or column objects serve as a template for generating the form 515. Once the form 515 is displayed, the user may enter a data input (e.g., a data input 405) that the user would like to have applied across multiple corresponding columns or rows. For example, the form 515 may include one or more fast fill input fields 525, and each fast fill input field 525 may correspond to a respective column or row of the data table 505. Based on an applicability indication, which may be received via an applicability field 520, a value (e.g., content) entered into a fast fill input field 525 may be applied within each applicable row of the data table 505 (where the fast fill input field 525 corresponds to a column of the data table 505) or within each applicable column of the data table (where the fast fill input field 525 corresponds to a row of the data table 505). The form 515 may include any quantity of fast fill input fields 525, and hence the user may enter a single respective data input for any quantity of columns for which the user would like matching values applied within the applicable rows (where each fast fill input field 525 and hence each of the entered data inputs corresponds to a different column of the data table 505) or for any quantity of rows for which the user would like matching values applied within the applicable columns (where each fast fill input field 525 and hence each of the entered data inputs corresponds to a different row of the data table 505). A user may choose to enter a respective fast fill data input for all of the fast fill input fields 525 included in the form 515 or for only a subset of the fast fill input fields 525. Though the example of FIG. 5 illustrates each fast fill input field 525 as a drop-down menu, it is to be understood that a fast fill input field 525 may be any type of input field capable of receiving a data input (e.g., a text box for accepting a free-form data input).

The form 515 may include an applicability field 520, via which an applicability indication may be received from the user. In the example of FIG. 5, the user may select, via the applicability field 520, to apply each entered fast fill data input to each row or column of the data table, and the entered inputs 1 through n may be applied to each column or row of the data table without additional manual entry by the user. In some other cases, the user may select, via the applicability field 520, to apply each entered fast fill data input to only a selected subset of rows or columns, as described for example with reference to FIG. 6. For instance, in the example illustrated in FIG. 5, each fast fill input field 525 may correspond to a different one of Parameters 1 through n from the data table 415 of FIG. 4, and using the applicability field 520, the user may select whether to apply the fast fill data inputs entered into one or more of fast fill input fields 525 to all rows of the data table 415 (e.g., to all computing systems) or to only a selected subset of the rows of the data table 415 (e.g., to only a selected subset of the computing systems).

Figure 6:
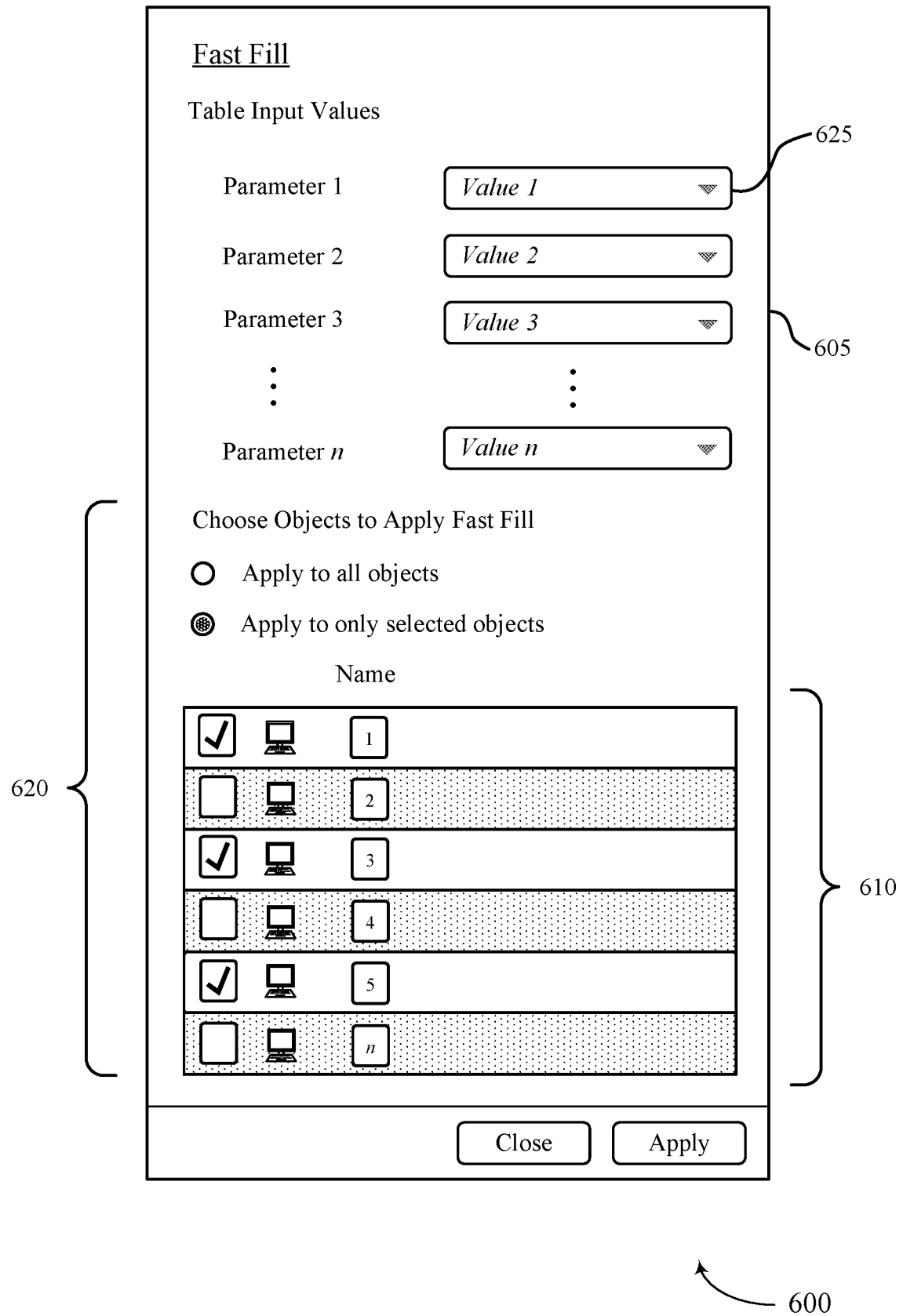
FIG. 6 illustrates an example of a user interface that supports fast fill for computerized data input in accordance with aspects of the present disclosure.

FIG. 6 illustrates an example of a user interface 600 that supports fast fill for computerized data input in accordance with aspects of the present disclosure. The user interface 600 includes a form 605, which may be an example of the form 515 described with reference to FIG. 5. In some examples, the user interface 600 may be implemented at a server 125, storage appliance 135, computing device 115, server 200, storage appliance 300, or any combination thereof as described with respect to FIGS. 1 through 3, and may be an extension of data input configurations 400 and 500 described with respect to FIGS. 4 and 5.

The form 605 may be generated and displayed, and a respective fast fill data input may be entered by the user into one or more of the fast fill input fields 625 as described with reference to FIG. 5 (as fast fill input fields 625 may be the same as fast fill input fields 525).

The form 605 may include an applicability field 620, which may be an example of an applicability field 520 as described with reference to FIG. 5. In the example of FIG. 6, the user may select, via the applicability field 620, to apply the one or more entered fast fill data inputs to only a selected subset of rows or columns of the table, and hence the values (content) of those one or more fast fill data inputs may be applied to only the selected rows (if each columns or rows of the data table. In some cases, based on (e.g., responsive to) the user electing to apply the inputs to only a selected subset of objects, additional input fields 610 may be displayed to the user, which may depict or otherwise represent different rows or columns of the data table 415 that the user may select for application of the one or more entered fast fill data inputs. For instance, in the example illustrated by FIG. 6, the user may select via the additional input fields 610 to apply values 1 through n corresponding to Parameter 1, Parameter 2, Parameter 3, through Parameter n as entered into the corresponding fast fill input fields 625 of the selected inputs to rows 1, 3, and 5 of the data table 415. The user may select the applicable rows (e.g., rows, 1, 3, and 5) by selecting the rows in the additional input fields 610, and may enter a fast fill data input into one or multiple of the fast fill input fields 625.

Although the example illustrated in FIG. 6 shows the user as directly indicating which rows or columns are included in the applicable subset, in some other examples, the user may indicate which rows or columns are included in the applicable subset based on indicating one or more filtering criteria. For example, the user may indicate to apply the one or more entered fast fill data inputs to rows that satisfy the one or more filtering criteria (e.g., rows in which the corresponding computing system has some target characteristic, such as a different parameter having a particular value). As one such example, for the sake of clarity in illustration, if Parameter 1 is a country in which a computing system is located, the one or more filtering criteria may indicate that the one or more entered fast fill data inputs are to be applied only to rows corresponding to computing systems located in Germany. An applicability indication may indicate any quantity of filtering criteria (e.g., based on Boolean logic or other combinational schemes). In some other examples, the user may be able to search from all rows using a search feature, and may select specific rows to apply the fast fill.

Figure 7:
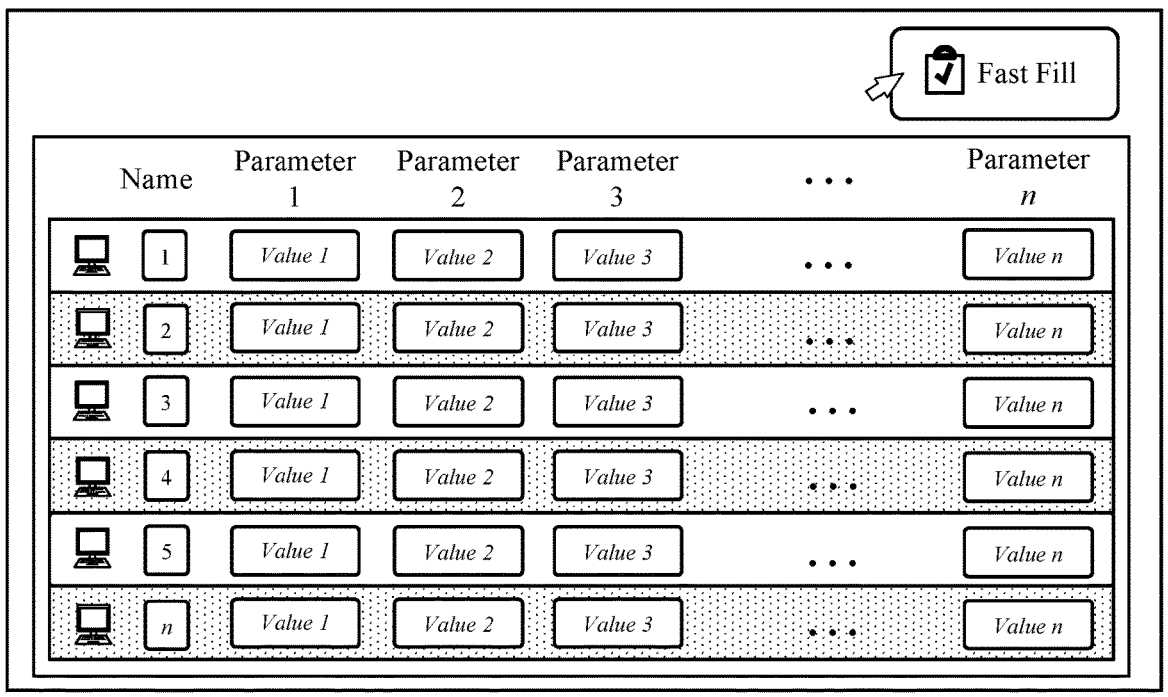
FIG. 7 illustrates example fast fill population schemes that support fast fill for computerized data input in accordance with aspects of the present disclosure.
Figure 7:
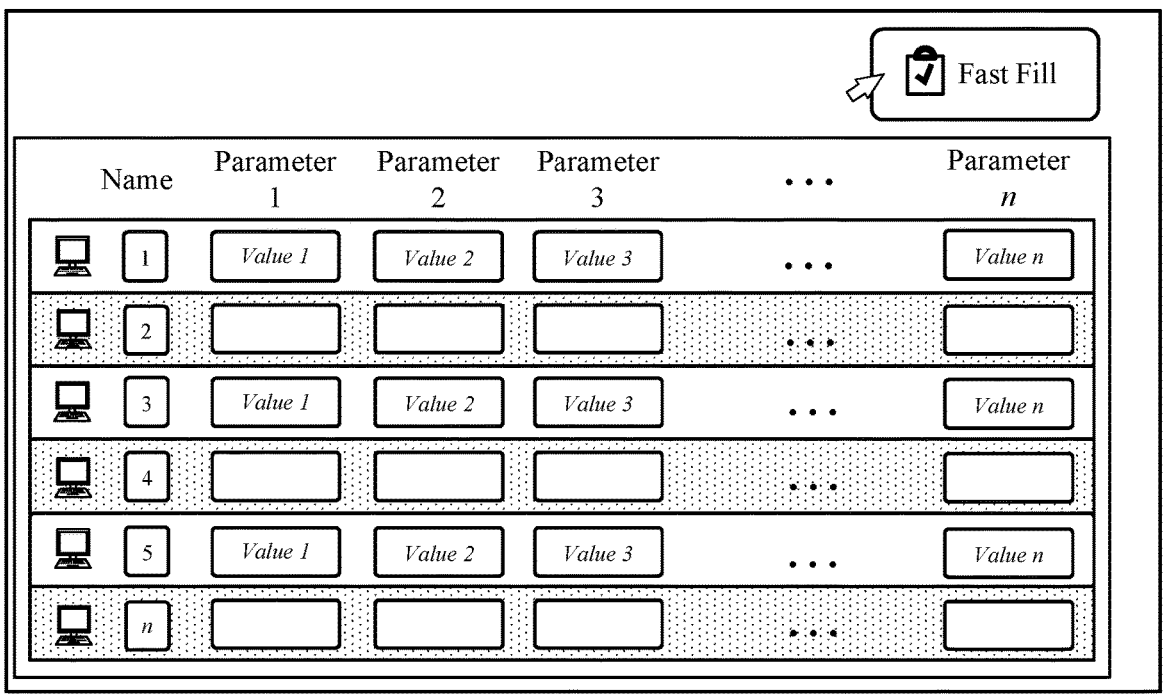

FIG. 7 illustrates example fast fill population schemes 700-*a* and 700-*b* that support fast fill for computerized data input in accordance with aspects of the present disclosure. The fast fill population schemes 700-*a* and 700-*b* may be displays at a user interface that the user may receive based upon (e.g., after) applying the fast fill techniques described herein. In some examples, the fast fill population schemes 700-*a* and 700-*b* may be implemented at a server 125, storage appliance 135, computing device 115, server 200, storage appliance 300, or any combination thereof as described with respect to FIGS. 1 through 3, and may be an extension of the fast fill procedures described with reference to FIGS. 4 through 6.

As described with reference to FIGS. 4 through 6, upon entering one or more fast fill data inputs and selecting the applicable rows or columns therefor, the user may apply the fast fill and close the autogenerated form (e.g., form 515 or 605). Based on which rows or columns the user selected, fast fill will populate the data table according to a fast fill population scheme such as fast fill population schemes 700-a and 700-b.

In fast fill population scheme 700-a, the user previously elected to apply a set of fast fill data inputs to all of the rows 1 through n of the data table (e.g., data table 415), as in the example illustrated in FIG. 5. Hence, a matching set of column inputs (e.g., value 1, value 2, value 3, through value n) each entered into a respective fast fill input field may be auto-populated to each row of the table using the fast fill.

In fast fill population scheme 700-b, the user previously elected to apply fast fill to only rows 1, 3, and 5 of the data table (e.g., data table 415), as in the example illustrated in FIG. 6. Hence, a matching set of column inputs (e.g., value 1, value 2, value 3, through value n) each entered into a respective fast fill input field may be auto-populated to only the elected subset of rows (rows 1, 3, 5). The input fields 425 of the other rows may be unimpacted by the fast fill procedure used to populate rows 1, 3, 5. Further, although in the illustrated example, all of columns 1 through n are populated using the fast fill procedure, it is to be understood that in other examples the fast fill procedure may be applied to populate only a subset of the columns and to not impact any other column or columns (e.g., the user may have left one or more of the fast fill input fields 625 blank or otherwise unselected, in which one or more corresponding columns of the data table may be unimpacted).

In addition, the user may use repeated fast fill procedures for the same data table to apply changes or different filter sets. For example, with reference to fast fill population scheme 700-b, the user may use a second fast fill procedure to populate (or update, if already populated) input fields within rows 2 and 4 with corresponding shared values. In these and other examples, fast fill for computerized data input as described herein may reduce the time that it takes the user to manually fill in different data inputs (or change existing data inputs).

Figure 8:
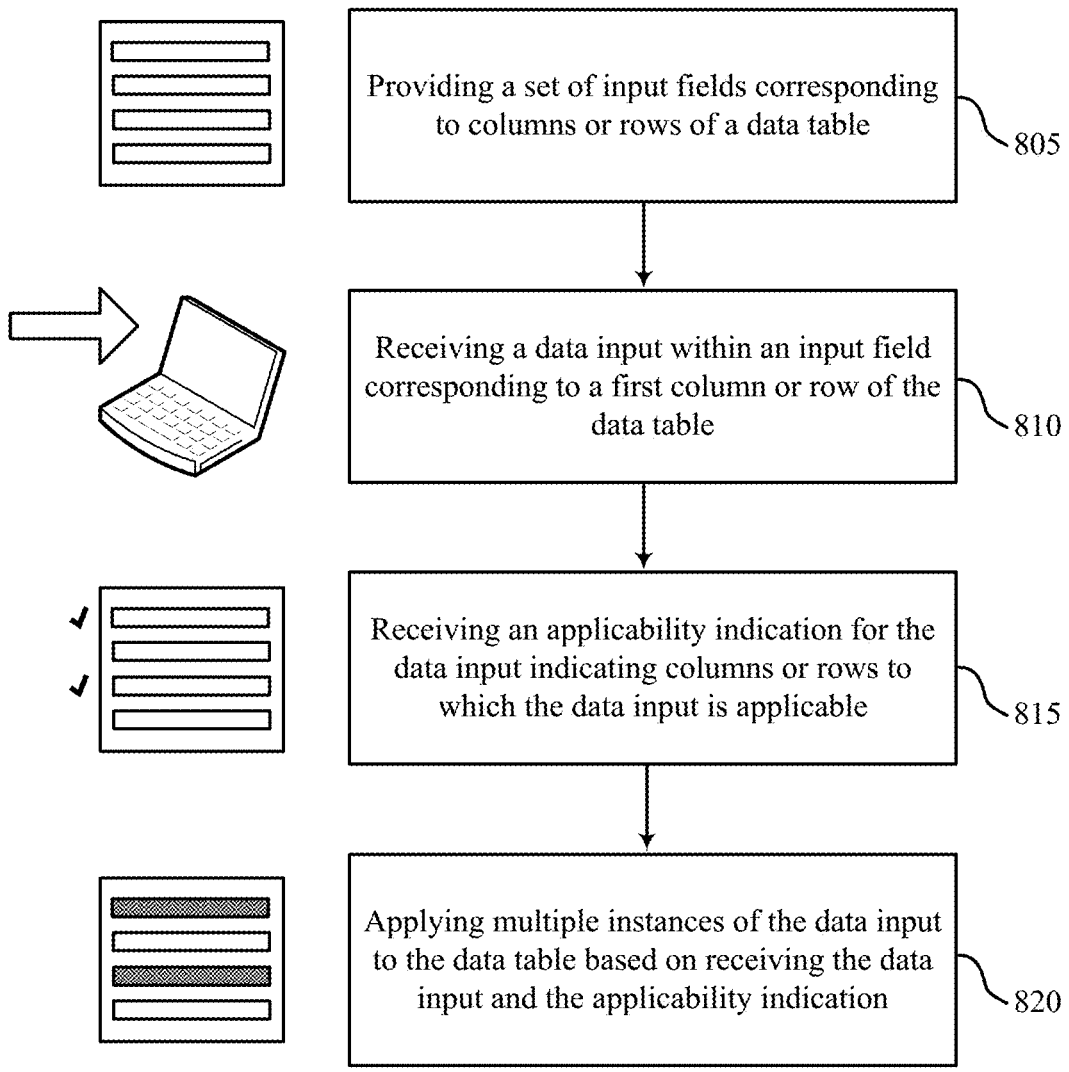
FIG. 8 illustrates an example of a process flow that supports fast fill for computerized data input in accordance with aspects of the present disclosure.

FIG. 8 illustrates an example of a process flow 800 that supports fast fill for computerized data input in accordance with aspects of the present disclosure. The process flow 800 may implement aspects of the fast fill procedures described with reference to FIGS. 4 through 7.

The process flow 800 may describe a method for data input at a user interface. At 805, a set of input fields may be provided at the user interface, the set of user input fields corresponding to respective columns or to respective rows of a data table, were the data table includes rows and columns. In some examples, the rows of the data table correspond to respective computing systems (e.g., virtual machines) of a set of computing systems, and the columns of the data table correspond to respective configuration parameters for the set of computing systems (e.g., a target network, an internet protocol (IP) configuration, and IP address, an IP netmask, one or more domain name system (DNS) servers, gateway information, or any combination thereof). In such examples, applying the multiple instances of the data input to the data table may include entering a common value for a configuration parameter corresponding to the first column for computing systems corresponding to the subset of the rows.

At 810, a data input within an input field of the set of input fields may be received via the user interface. In some examples, the input field corresponds to a first column or to a first row of the data table, and may be autogenerated based on identifying the rows of the data table or the columns of the data table.

At 815, an applicability indication for the data input may be received via the user interface. In some examples, the applicability indication may indicate that the data input is applicable to a subset of the rows or a subset of the columns. In such cases, the subset of rows or the subset of columns may include at least two rows or at least two columns that are non-consecutive. Additionally or alternatively, the applicability indication may be based on a user input indicating the subset of the rows or the subset of the columns for which the data input is applicable. The applicability indication may further indicate one or more filtering criteria associated with a second column or second row of the data table.

At 820, multiple instances of the data input may be applied to the data table based on receiving the data input within the input field and the applicability indication. In some examples, respective instances of the data input may be applied to only the subset of the rows within the first column or to only the subset of the columns within the first row. In some other examples, applying the multiple instances of the data input may include identifying (e.g., the second column or the second row of the data table) entries that satisfy the one or more filtering criteria, and applying (e.g., within the first column or the first row), instances of the data input to rows or columns comprising the entries that satisfy the one or more filtering criteria.

In some other examples, an additional data input may be received at the user interface within an additional input field of the set of input fields. In some cases, the additional input field may correspond to a different column or to a different row of the data table, the applicability indication indicates that the additional data input is applicable to the subset of the rows or the subset of the columns. Multiple instances of the additional data input may then be applied to the data table such that respective instances of the additional data input are applied to only the subset of the rows within the different column or to only the subset of the columns within the different row.

In some other examples, a second data input may be received at the user interface within the input field of the set of input fields after applying the multiple instances of the data input to the data table. A second applicability indication may then be received for the second data input, which indicates that the second data input is applicable to a second subset of the rows or a second subset of the columns. Based on the second applicability indication, multiple instances of the second data input may be applied to the data table, where respective instances of the second data input are applied to only the second subset of the rows within the first column or to only the second subset of the columns within the first row.

Upon applying the multiple instances of the data input to the data table, a display may be generated which shows the data table with entries matching the data input in the subset of the rows within the first column or the subset of the columns within the first row.

Figure 9:
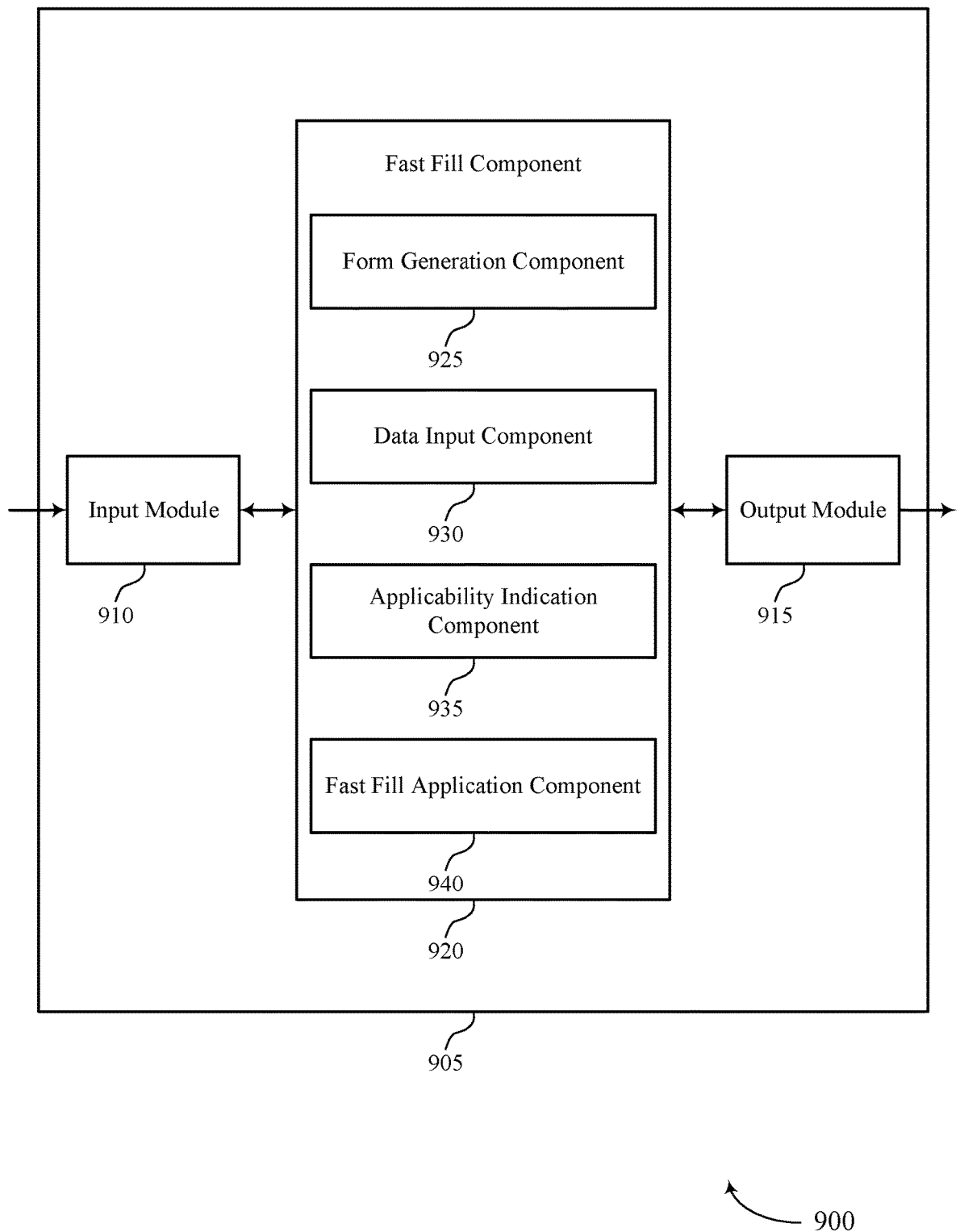
FIG. 9 shows a block diagram of an apparatus that supports fast fill for computerized data input in accordance with aspects of the present disclosure.

FIG. 9 shows a block diagram 900 of a device 905 that supports fast fill for computerized data input in accordance with aspects of the present disclosure. The device 905 may include an input module 910, an output module 915, and a fast fill component 920. The device 905 may also include a processor. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the fast fill component 920 to support fast fill for computerized data input. In some cases, the input module 910 may be a component of a network interface 1110 as described with reference to FIG. 11.

The output module 915 may manage output signals for the device 905. For example, the output module 915 may receive signals from other components of the device 905, such as the fast fill component 920, and may transmit these signals to other components or devices. In some examples, the output module 915 may transmit output signals for display in a user interface, for storage in a database or data store, for further processing at a server or server cluster, or for any other processes at any number of devices or systems. In some cases, the output module 915 may be a component of a network interface 1110 as described with reference to FIG. 11.

For example, the fast fill component 920 may include an form generation component 925, a data input component 930, an applicability indication component 935, a fast fill application component 940, or any combination thereof. In some examples, the fast fill component 920, or various components thereof, may be configured to perform various operations (e.g., receiving, monitoring, transmitting) using or otherwise in cooperation with the input module 910, the output module 915, or both. For example, the fast fill component 920 may receive information from the input module 910, send information to the output module 915, or be integrated in combination with the input module 910, the output module 915, or both to receive information, transmit information, or perform various other operations as described herein.

The fast fill component 920 may support data input via a user interface in accordance with examples as disclosed herein. The form generation component 925 may be configured as or otherwise support a means for providing, at the user interface, a set of input fields corresponding to respective columns or to respective rows of a data table, wherein the data table comprises rows and columns. The data input component 930 may be configured as or otherwise support a means for receiving, via the user interface, a data input within an input field of the set of input fields, wherein the input field corresponds to a first column or to a first row of the data table. The applicability indication component 935 may be configured as or otherwise support a means for receiving, via the user interface, an applicability indication for the data input, wherein the applicability indication indicates that the data input is applicable to a subset of the rows or a subset of the columns. The fast fill application component 940 may be configured as or otherwise support a means for applying multiple instances of the data input to the data table based at least in part on receiving the data input within the input field and the applicability indication, wherein respective instances of the data input are applied to only the subset of the rows within the first column or to only the subset of the columns within the first row.

Figure 10:
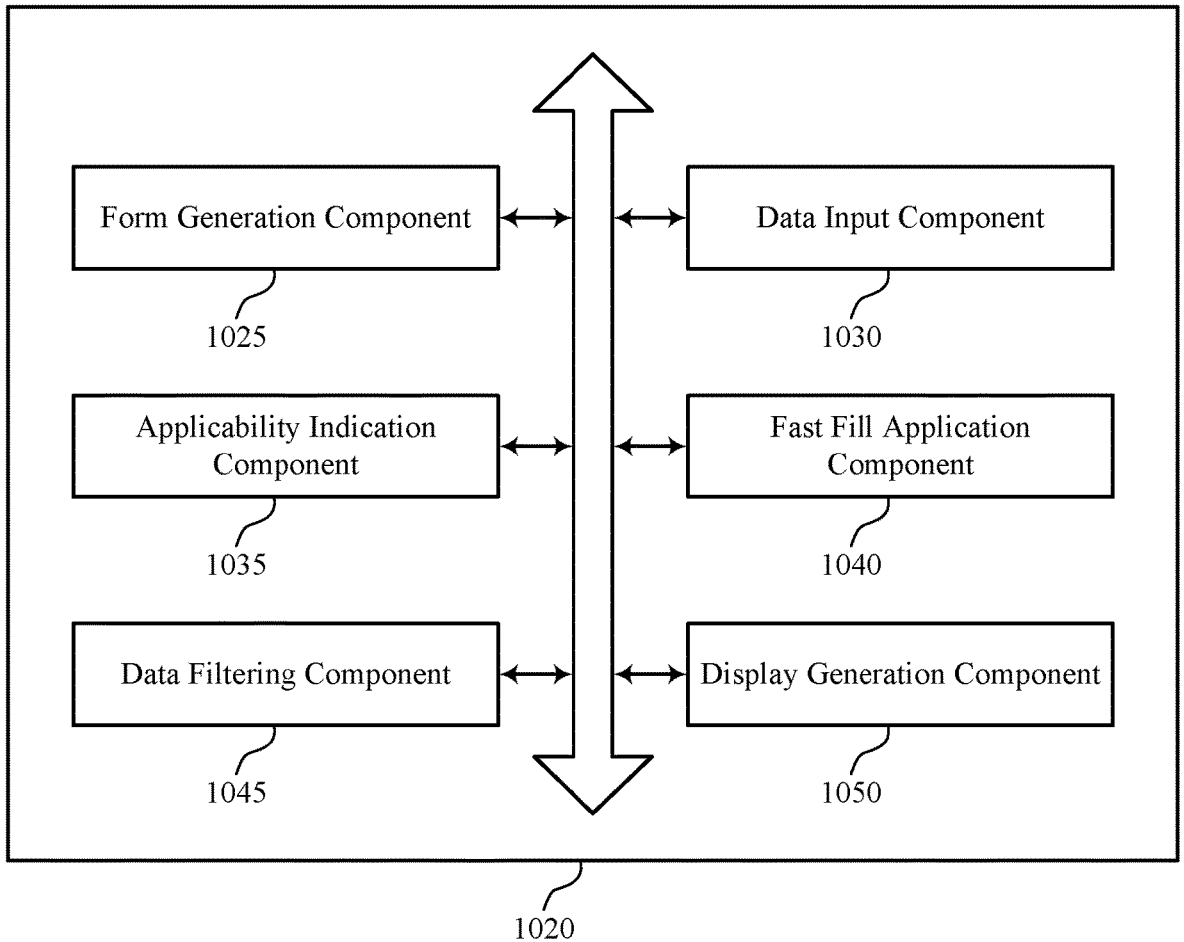
FIG. 10 shows a block diagram of a fast fill component that supports fast fill for computerized data input in accordance with aspects of the present disclosure.

FIG. 10 shows a block diagram 1000 of a fast fill component 1020 that supports fast fill for computerized data input in accordance with aspects of the present disclosure. The fast fill component 1020 may be an example of aspects of a fast fill component or a fast fill component 920, or both, as described herein. The fast fill component 1020, or various components thereof, may be an example of means for performing various aspects of fast fill for computerized data input as described herein. For example, the fast fill component 1020 may include an form generation component 1025, a data input component 1030, an applicability indication component 1035, a fast fill application component 1040, a data filtering component 1045, a display generation component 1050, or any combination thereof. Each of these components may communicate, directly or indirectly, with one another (e.g., via one or more buses).

The fast fill component 1020 may support data input via a user interface in accordance with examples as disclosed herein. The form generation component 1025 may be configured as or otherwise support a means for providing, at the user interface, a set of input fields corresponding to respective columns or to respective rows of a data table, wherein the data table comprises rows and columns. The data input component 1030 may be configured as or otherwise support a means for receiving, via the user interface, a data input within an input field of the set of input fields, wherein the input field corresponds to a first column or to a first row of the data table. The applicability indication component 1035 may be configured as or otherwise support a means for receiving, via the user interface, an applicability indication for the data input, wherein the applicability indication indicates that the data input is applicable to a subset of the rows or a subset of the columns. The fast fill application component 1040 may be configured as or otherwise support a means for applying multiple instances of the data input to the data table based at least in part on receiving the data input within the input field and the applicability indication, wherein respective instances of the data input are applied to only the subset of the rows within the first column or to only the subset of the columns within the first row.

In some examples, the applicability indication comprises a user input indicating the subset of the rows or the subset of the columns for which the data input is applicable.

In some examples, the applicability indication comprises one or more filtering criteria associated with a second column or second row of the data table.

In some examples, to support applying the multiple instances of the data input to the data table based at least in part on receiving the data input within the input field and the applicability indication, the data filtering component 1045 may be configured as or otherwise support a means for identifying, within the second column or the second row of the data table, entries that satisfy the one or more filtering criteria. In some examples, to support applying the multiple instances of the data input to the data table based at least in part on receiving the data input within the input field and the applicability indication, the fast fill application component 1040 may be configured as or otherwise support a means for applying, within the first column or the first row, instances of the data input to rows or columns comprising the entries that satisfy the one or more filtering criteria.

In some examples, the rows of the data table correspond to respective virtual machines of a set of virtual machines. In some examples, the columns of the data table correspond to respective configuration parameters for the set of virtual machines. In some examples, applying the multiple instances of the data input to the data table comprises entering, for virtual machines corresponding to the subset of the rows, a common value for a configuration parameter corresponding to the first column.

In some examples, the respective configuration parameters comprise a target network, an internet protocol (IP) configuration, and IP address, an IP netmask, one or more domain name system (DNS) servers, gateway information, or any combination thereof.

In some examples, the data input component 1030 may be configured as or otherwise support a means for identifying the rows of the data table or the columns of the data table. In some examples, the form generation component 1025 may be configured as or otherwise support a means for autogenerating the set of input fields based at least in part on identifying the rows of the data table or the columns of the data table.

In some examples, at least two rows within the subset of rows or at least two columns within the subset of columns are non-consecutive.

In some examples, the data input component 1030 may be configured as or otherwise support a means for receiving, via the user interface, an additional data input within an additional input field of the set of input fields, wherein the additional input field corresponds to a different column or to a different row of the data table, and wherein the applicability indication indicates that the additional data input is applicable to the subset of the rows or the subset of the columns. In some examples, the fast fill application component 1040 may be configured as or otherwise support a means for applying multiple instances of the additional data input to the data table based at least in part on receiving the additional data input within the additional input field and the applicability indication, wherein respective instances of the additional data input are applied to only the subset of the rows within the different column or to only the subset of the columns within the different row.

In some examples, the data input component 1030 may be configured as or otherwise support a means for receiving, via the user interface after applying the multiple instances of the data input to the data table, a second data input within the input field of the set of input fields. In some examples, the applicability indication component 1035 may be configured as or otherwise support a means for receiving, via the user interface, a second applicability indication for the second data input, wherein the second applicability indication indicates that the second data input is applicable to a second subset of the rows or a second subset of the columns. In some examples, the fast fill application component 1040 may be configured as or otherwise support a means for applying multiple instances of the second data input to the data table based at least in part on receiving the second data input within the input field and the second applicability indication, wherein respective instances of the second data input are applied to only the second subset of the rows within the first column or to only the second subset of the columns within the first row.

In some examples, the display generation component 1050 may be configured as or otherwise support a means for generating, after applying the multiple instances of the data input to the data table, a display showing the data table with entries matching the data input in the subset of the rows within the first column or the subset of the columns within the first row.

Figure 11:
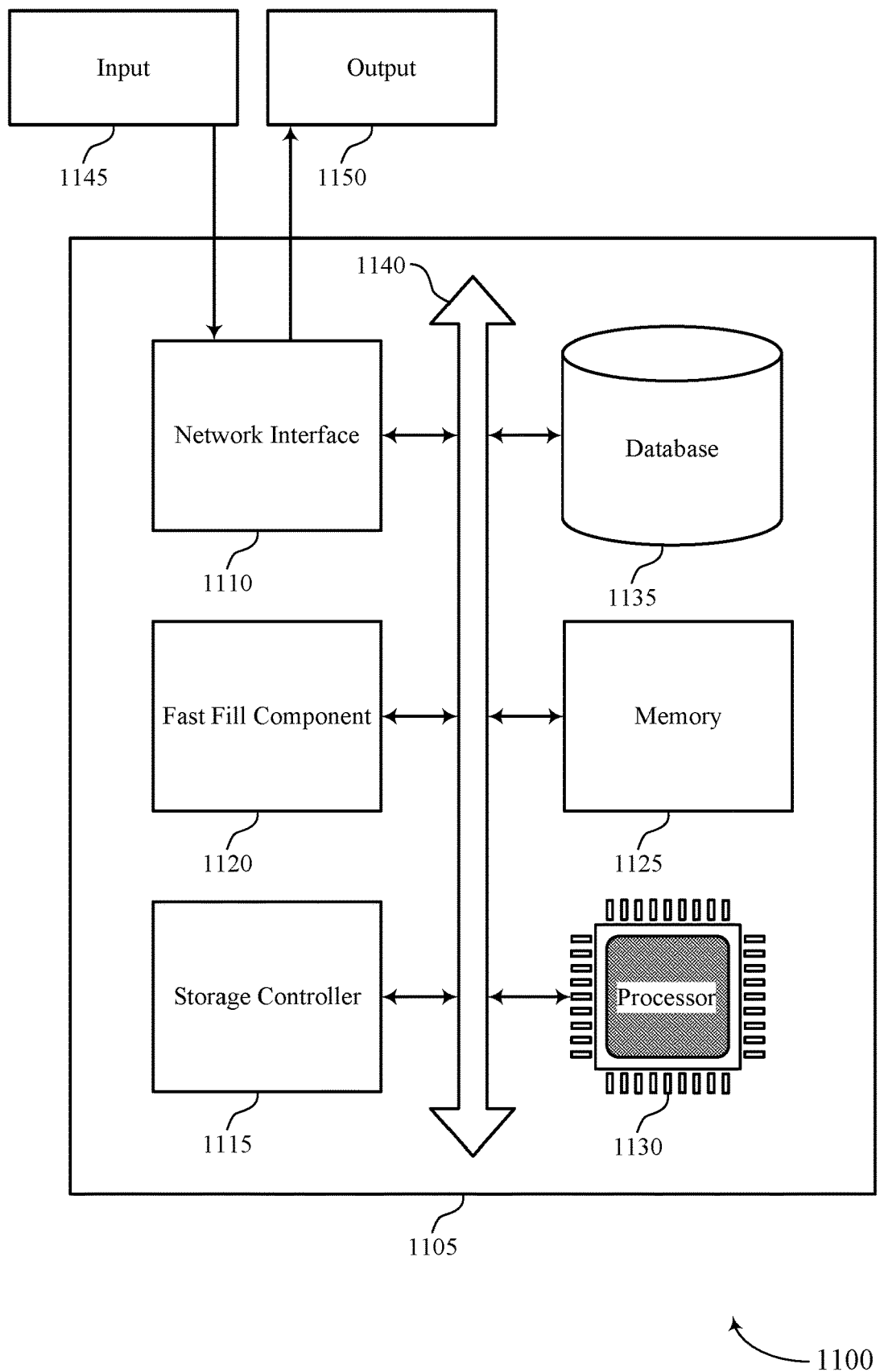
FIG. 11 shows a diagram of a system including a device that supports fast fill for computerized data input in accordance with aspects of the present disclosure.

FIG. 11 shows a diagram of a system 1100 including a device 1105 that supports fast fill for computerized data input in accordance with aspects of the present disclosure. The device 1105 may be an example of or include the components of a device 905 as described herein. The device 1105 may include components for bi-directional data communications including components for transmitting and receiving communications, such as a fast fill component 1120, a network interface 1110, a storage controller 1115, a memory 1125, a processor 1130, and a database 1135. These components may be in electronic communication or otherwise coupled (e.g., operatively, communicatively, functionally, electronically, electrically) via one or more buses (e.g., a bus 1140).

The network interface 1110 may manage input signals 1145 and output signals 1150 for the device 1105. The network interface 1110 may also manage peripherals not integrated into the device 1105. In some cases, the network interface 1110 may represent a physical connection or port to an external peripheral. In some cases, the network interface 1110 may utilize an operating system such as iOS®, ANDROID®, MS-DOS®, MS-WINDOWS®, OS/2®, UNIX®, LINUX®, or another known operating system. In other cases, the network interface 1110 may represent or interact with a modem, a keyboard, a mouse, a touchscreen, or a similar device. In some cases, the network interface 1110 may be implemented as part of a processor 1130. In some examples, a user may interact with the device 1105 via the network interface 1110 or via hardware components controlled by the network interface 1110.

The storage controller 1115 may manage data storage and processing in a database 1135. In some cases, a user may interact with the storage controller 1115. In other cases, the storage controller 1115 may operate automatically without user interaction. The database 1135 may be an example of a single database, a distributed database, multiple distributed databases, a data store, a data lake, or an emergency backup database.

Memory 1125 may include random-access memory (RAM) and ROM. The memory 1125 may store computer-readable, computer-executable software including instructions that, when executed, cause the processor 1130 to perform various functions described herein. In some cases, the memory 1125 may contain, among other things, a BIOS which may control basic hardware or software operation such as the interaction with peripheral components or devices.

The processor 1130 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in a memory 1125 to perform various functions (e.g., functions or tasks supporting fast fill for computerized data input).

The fast fill component 1120 may support data input via a user interface in accordance with examples as disclosed herein. For example, the fast fill component 1120 may be configured as or otherwise support a means for providing, at the user interface, a set of input fields corresponding to respective columns or to respective rows of a data table, wherein the data table comprises rows and columns. The fast fill component 1120 may be configured as or otherwise support a means for receiving, via the user interface, a data input within an input field of the set of input fields, wherein the input field corresponds to a first column or to a first row of the data table. The fast fill component 1120 may be configured as or otherwise support a means for receiving, via the user interface, an applicability indication for the data input, wherein the applicability indication indicates that the data input is applicable to a subset of the rows or a subset of the columns. The fast fill component 1120 may be configured as or otherwise support a means for applying multiple instances of the data input to the data table based at least in part on receiving the data input within the input field and the applicability indication, wherein respective instances of the data input are applied to only the subset of the rows within the first column or to only the subset of the columns within the first row.

By including or configuring the fast fill component 1120 in accordance with examples as described herein, the device 1105 may support techniques for improved communication reliability, improved user experience related to reduced time and effort spent in manually filling out data entries, efficient utilization of computing resources, and increased flexibility and scalability for data entry.

Figure 12:
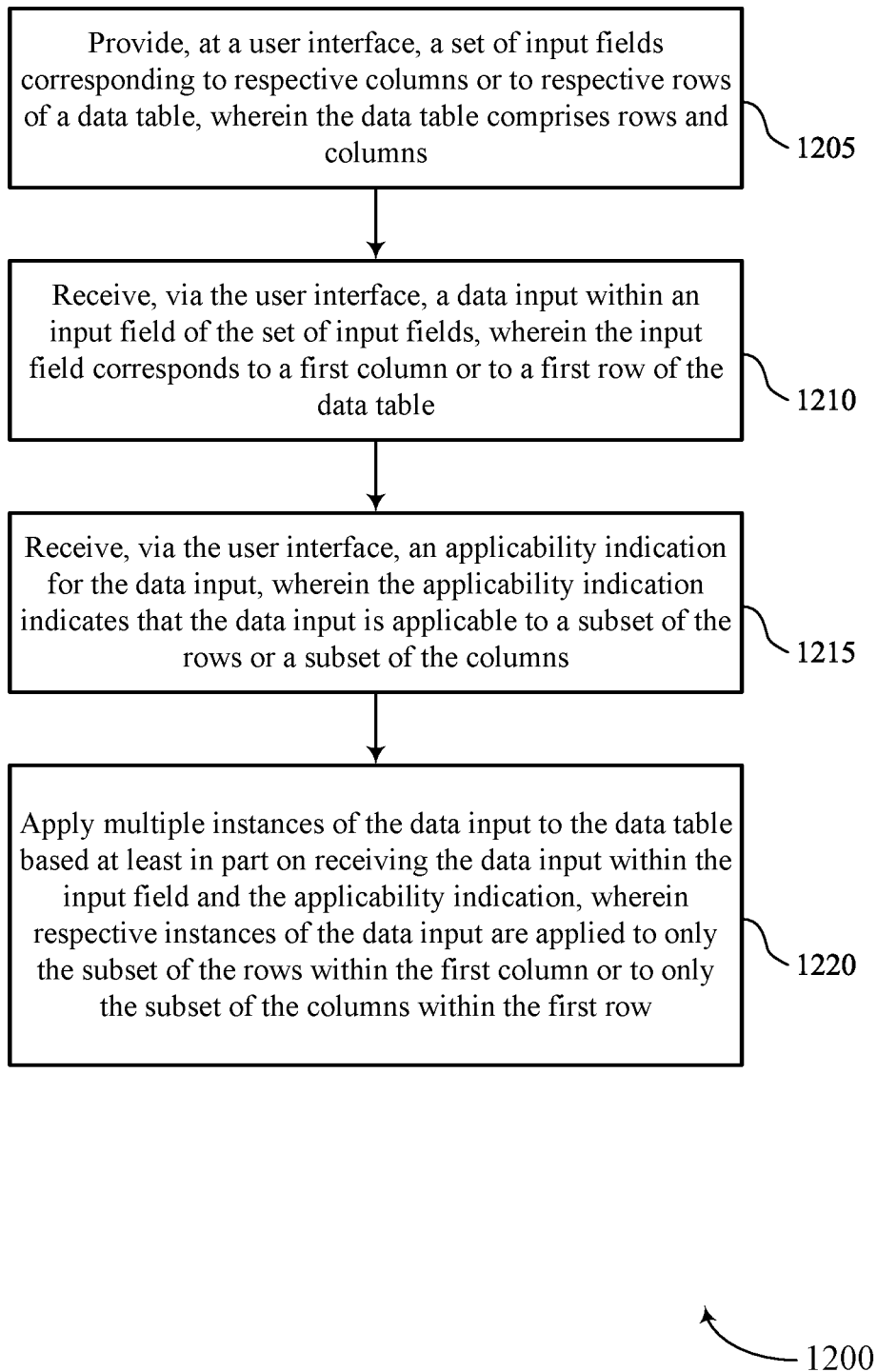
FIGS. 12 through 16 show flowcharts illustrating methods that support fast fill for computerized data input in accordance with aspects of the present disclosure.

FIG. 12 shows a flowchart illustrating a method 1200 that supports fast fill for computerized data input in accordance with aspects of the present disclosure. The operations of the method 1200 may be implemented by a fast fill device or its components as described herein. For example, the operations of the method 1200 may be performed by a fast fill device as described with reference to FIGS. 1 through 11. In some examples, a fast fill device may execute a set of instructions to control the functional elements of the fast fill device to perform the described functions. Additionally or alternatively, the fast fill device may perform aspects of the described functions using special-purpose hardware.

At 1205, the method may include providing, at a user interface, a set of input fields corresponding to respective columns or to respective rows of a data table, wherein the data table comprises rows and columns. The operations of 1205 may be performed in accordance with examples as disclosed herein. In some examples, aspects of the operations of 1205 may be performed by an form generation component 1025 as described with reference to FIG. 10.

At 1210, the method may include receiving, via the user interface, a data input within an input field of the set of input fields, wherein the input field corresponds to a first column or to a first row of the data table. The operations of 1210 may be performed in accordance with examples as disclosed herein. In some examples, aspects of the operations of 1210 may be performed by a data input component 1030 as described with reference to FIG. 10.

At 1215, the method may include receiving, via the user interface, an applicability indication for the data input, wherein the applicability indication indicates that the data input is applicable to a subset of the rows or a subset of the columns. The operations of 1215 may be performed in accordance with examples as disclosed herein. In some examples, aspects of the operations of 1215 may be performed by an applicability indication component 1035 as described with reference to FIG. 10.

At 1220, the method may include applying multiple instances of the data input to the data table based at least in part on receiving the data input within the input field and the applicability indication, wherein respective instances of the data input are applied to only the subset of the rows within the first column or to only the subset of the columns within the first row. The operations of 1220 may be performed in accordance with examples as disclosed herein. In some examples, aspects of the operations of 1220 may be performed by a fast fill application component 1040 as described with reference to FIG. 10.

Figure 13:
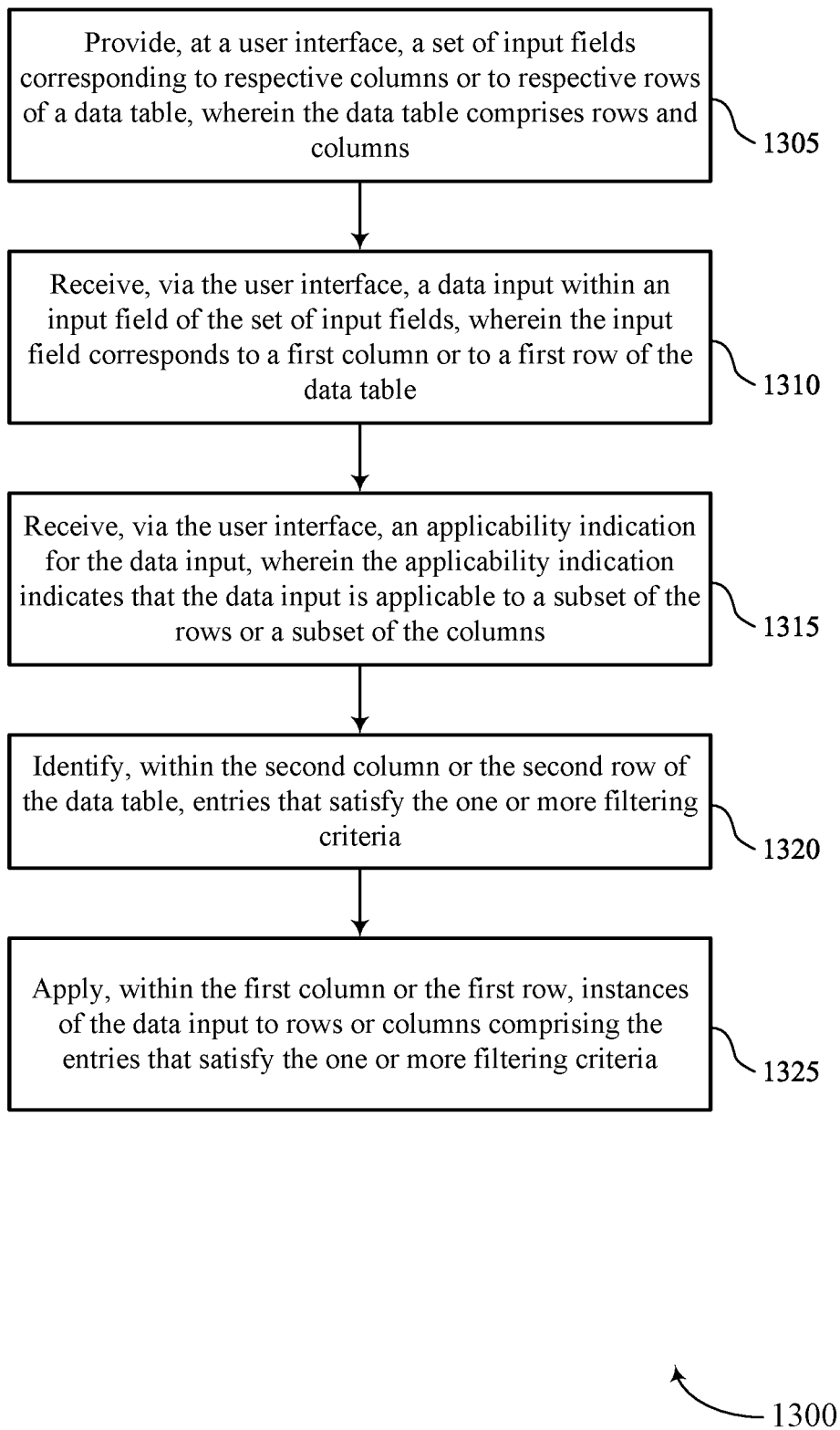

FIG. 13 shows a flowchart illustrating a method 1300 that supports fast fill for computerized data input in accordance with aspects of the present disclosure. The operations of the method 1300 may be implemented by a fast fill device or its components as described herein. For example, the operations of the method 1300 may be performed by a fast fill device as described with reference to FIGS. 1 through 11. In some examples, a fast fill device may execute a set of instructions to control the functional elements of the fast fill device to perform the described functions. Additionally or alternatively, the fast fill device may perform aspects of the described functions using special-purpose hardware.

At 1305, the method may include providing, at a user interface, a set of input fields corresponding to respective columns or to respective rows of a data table, wherein the data table comprises rows and columns. The operations of 1305 may be performed in accordance with examples as disclosed herein. In some examples, aspects of the operations of 1305 may be performed by an form generation component 1025 as described with reference to FIG. 10.

At 1310, the method may include receiving, via the user interface, a data input within an input field of the set of input fields, wherein the input field corresponds to a first column or to a first row of the data table. The operations of 1310 may be performed in accordance with examples as disclosed herein. In some examples, aspects of the operations of 1310 may be performed by a data input component 1030 as described with reference to FIG. 10.

At 1315, the method may include receiving, via the user interface, an applicability indication for the data input, wherein the applicability indication indicates that the data input is applicable to a subset of the rows or a subset of the columns. The operations of 1315 may be performed in accordance with examples as disclosed herein. In some examples, aspects of the operations of 1315 may be performed by an applicability indication component 1035 as described with reference to FIG. 10.

At 1320, the method may include identifying, within the second column or the second row of the data table, entries that satisfy the one or more filtering criteria. The operations of 1320 may be performed in accordance with examples as disclosed herein. In some examples, aspects of the operations of 1320 may be performed by a data filtering component 1045 as described with reference to FIG. 10.

At 1325, the method may include applying, within the first column or the first row, instances of the data input to rows or columns comprising the entries that satisfy the one or more filtering criteria. The operations of 1325 may be performed in accordance with examples as disclosed herein. In some examples, aspects of the operations of 1325 may be performed by a fast fill application component 1040 as described with reference to FIG. 10.

Figure 14:
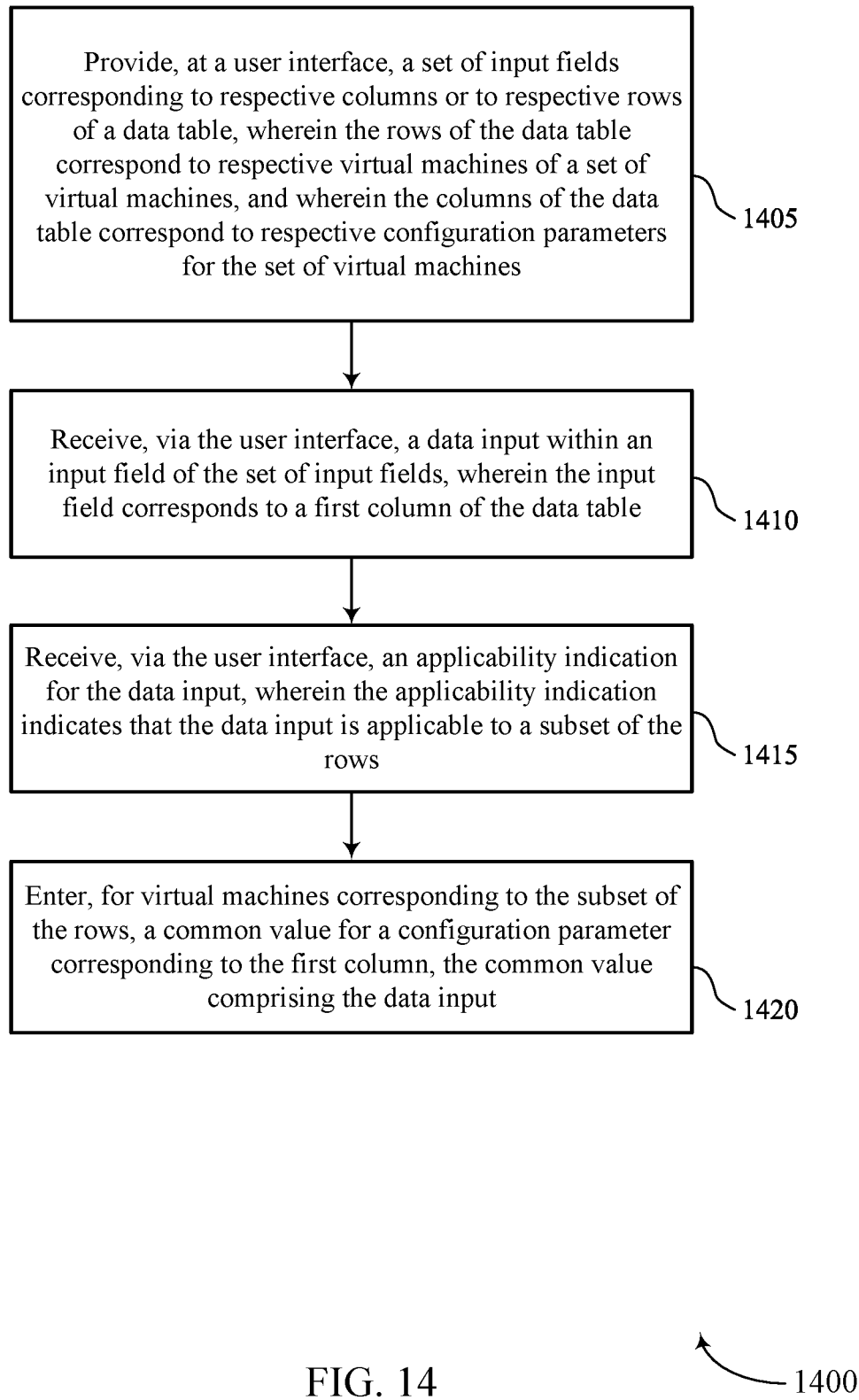

FIG. 14 shows a flowchart illustrating a method 1400 that supports fast fill for computerized data input in accordance with aspects of the present disclosure. The operations of the method 1400 may be implemented by a fast fill device or its components as described herein. For example, the operations of the method 1400 may be performed by a fast fill device as described with reference to FIGS. 1 through 11. In some examples, a fast fill device may execute a set of instructions to control the functional elements of the fast fill device to perform the described functions. Additionally or alternatively, the fast fill device may perform aspects of the described functions using special-purpose hardware.

At 1405, the method may include providing, at a user interface, a set of input fields corresponding to respective columns or to respective rows of a data table, wherein the rows of the data table correspond to respective virtual machines of a set of virtual machines, and wherein the columns of the data table correspond to respective configuration parameters for the set of virtual machines. The operations of 1405 may be performed in accordance with examples as disclosed herein. In some examples, aspects of the operations of 1405 may be performed by an form generation component 1025 as described with reference to FIG. 10.

At 1410, the method may include receiving, via the user interface, a data input within an input field of the set of input fields, wherein the input field corresponds to a first column of the data table. The operations of 1410 may be performed in accordance with examples as disclosed herein. In some examples, aspects of the operations of 1410 may be performed by a data input component 1030 as described with reference to FIG. 10.

At 1415, the method may include receiving, via the user interface, an applicability indication for the data input, wherein the applicability indication indicates that the data input is applicable to a subset of the rows. The operations of 1415 may be performed in accordance with examples as disclosed herein. In some examples, aspects of the operations of 1415 may be performed by an applicability indication component 1035 as described with reference to FIG. 10.

At 1420, the method may include entering, for virtual machines corresponding to the subset of the rows, a common value for a configuration parameter corresponding to the first column, the common value comprising the data input. The operations of 1420 may be performed in accordance with examples as disclosed herein. In some examples, aspects of the operations of 1420 may be performed by a fast fill application component 1040 as described with reference to FIG. 10.

Figure 15:
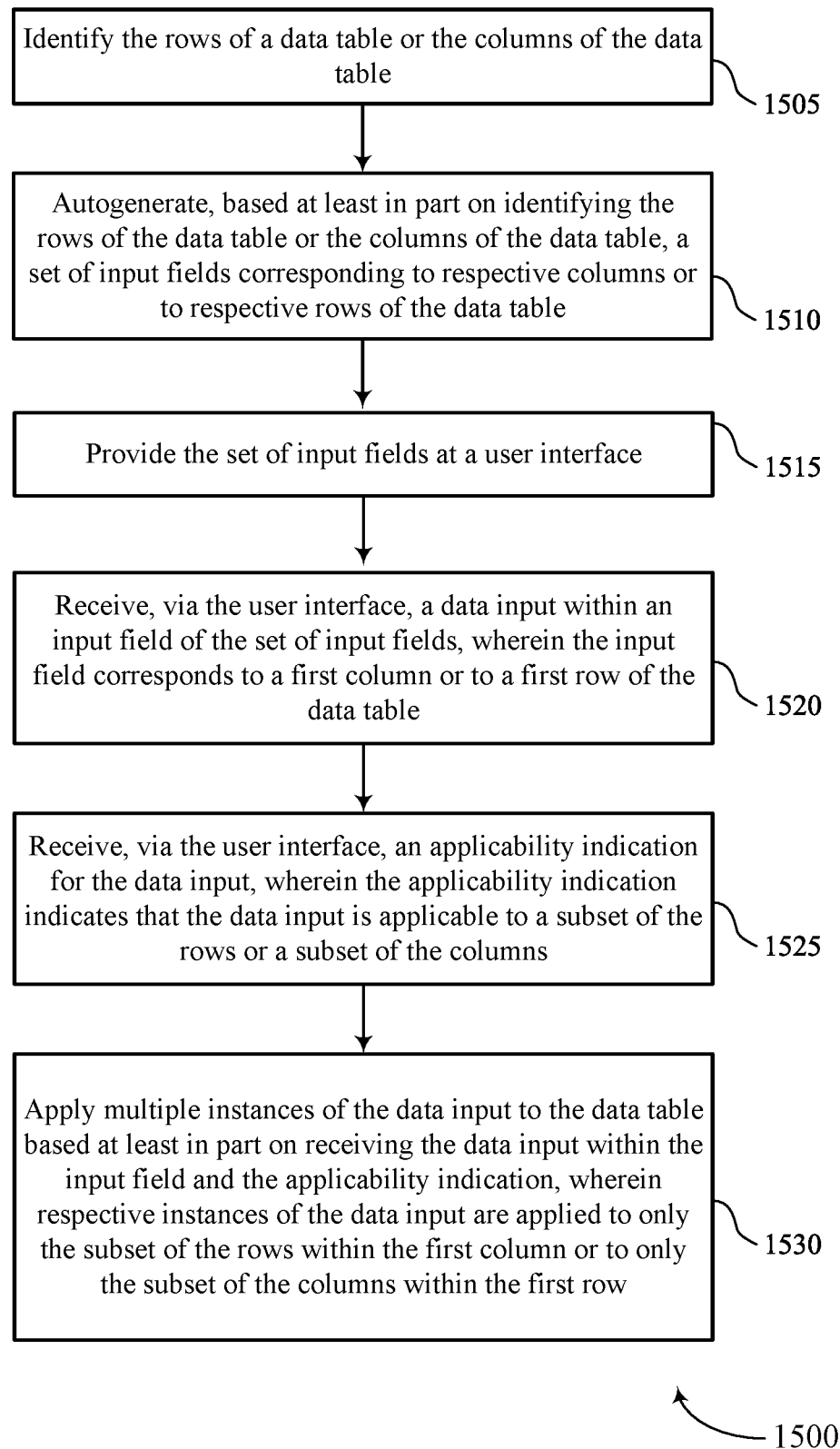

FIG. 15 shows a flowchart illustrating a method 1500 that supports fast fill for computerized data input in accordance with aspects of the present disclosure. The operations of the method 1500 may be implemented by a fast fill device or its components as described herein. For example, the operations of the method 1500 may be performed by a fast fill device as described with reference to FIGS. 1 through 11. In some examples, a fast fill device may execute a set of instructions to control the functional elements of the fast fill device to perform the described functions. Additionally or alternatively, the fast fill device may perform aspects of the described functions using special-purpose hardware.

At 1505, the method may include identifying the rows of a data table or the columns of the data table. The operations of 1510 may be performed in accordance with examples as disclosed herein. In some examples, aspects of the operations of 1510 may be performed by a data input component 1030 as described with reference to FIG. 10.

At 1510, the method may include autogenerating, based at least in part on identifying the rows of the data table or the columns of the data table, a set of input fields corresponding to respective columns or to respective rows of the data table. The operations of 1510 may be performed in accordance with examples as disclosed herein. In some examples, aspects of the operations of 1510 may be performed by an form generation component 1025 as described with reference to FIG. 10.

At 1505, the method may include providing the set of input fields at a user interface. The operations of 1505 may be performed in accordance with examples as disclosed herein. In some examples, aspects of the operations of 1505 may be performed by an form generation component 1025 as described with reference to FIG. 10.

At 1520, the method may include receiving, via the user interface, a data input within an input field of the set of input fields, wherein the input field corresponds to a first column or to a first row of the data table. The operations of 1520 may be performed in accordance with examples as disclosed herein. In some examples, aspects of the operations of 1520 may be performed by a data input component 1030 as described with reference to FIG. 10.

At 1525, the method may include receiving, via the user interface, an applicability indication for the data input, wherein the applicability indication indicates that the data input is applicable to a subset of the rows or a subset of the columns. The operations of 1525 may be performed in accordance with examples as disclosed herein. In some examples, aspects of the operations of 1525 may be performed by an applicability indication component 1035 as described with reference to FIG. 10.

At 1530, the method may include applying multiple instances of the data input to the data table based at least in part on receiving the data input within the input field and the applicability indication, wherein respective instances of the data input are applied to only the subset of the rows within the first column or to only the subset of the columns within the first row. The operations of 1530 may be performed in accordance with examples as disclosed herein. In some examples, aspects of the operations of 1530 may be performed by a fast fill application component 1040 as described with reference to FIG. 10.

Figure 16:
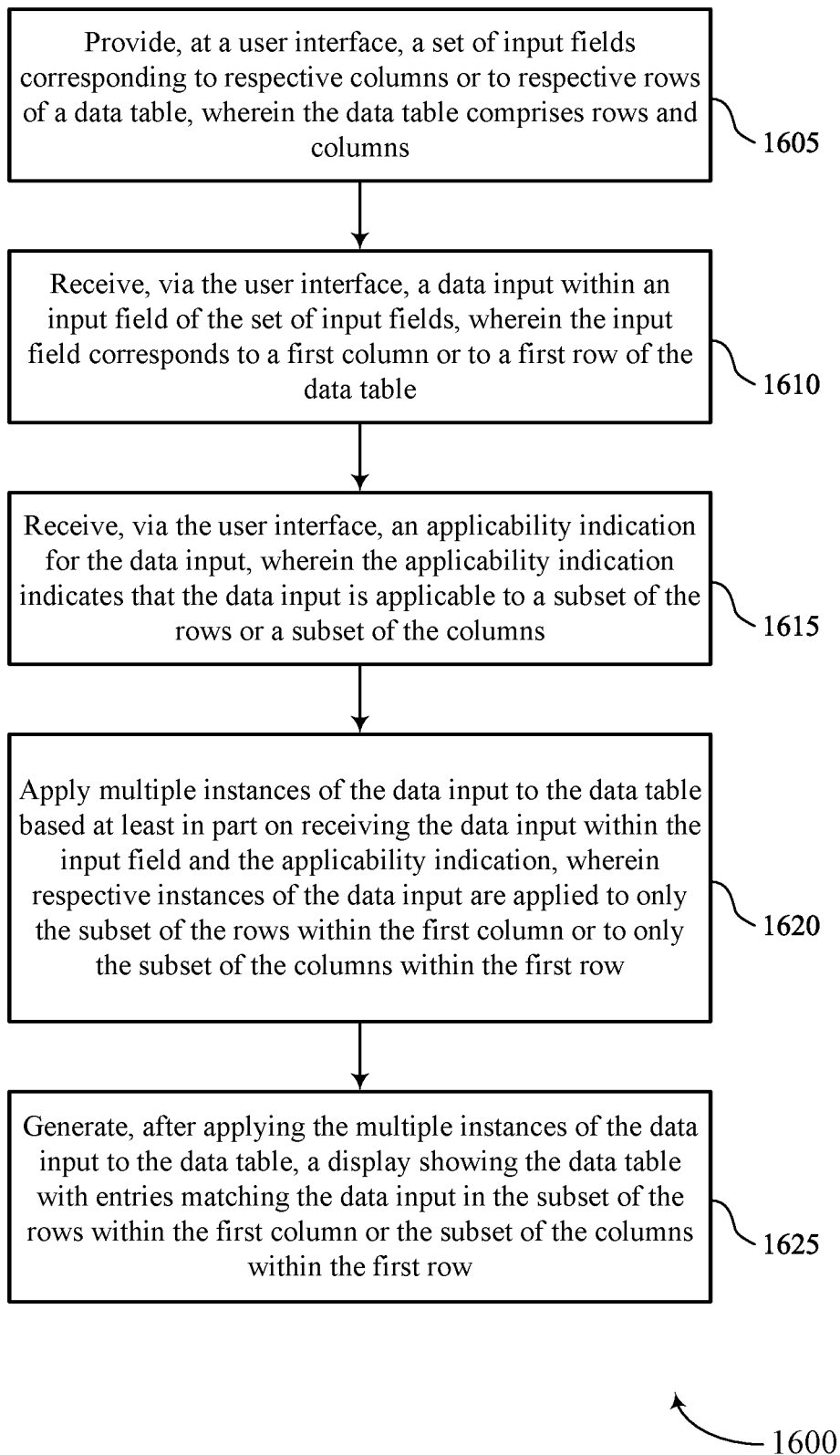

FIG. 16 shows a flowchart illustrating a method 1600 that supports fast fill for computerized data input in accordance with aspects of the present disclosure. The operations of the method 1600 may be implemented by a fast fill device or its components as described herein. For example, the operations of the method 1600 may be performed by a fast fill device as described with reference to FIGS. 1 through 11. In some examples, a fast fill device may execute a set of instructions to control the functional elements of the fast fill device to perform the described functions. Additionally or alternatively, the fast fill device may perform aspects of the described functions using special-purpose hardware.

At 1605, the method may include providing, at a user interface, a set of input fields corresponding to respective columns or to respective rows of a data table, wherein the data table comprises rows and columns. The operations of 1605 may be performed in accordance with examples as disclosed herein. In some examples, aspects of the operations of 1605 may be performed by an form generation component 1025 as described with reference to FIG. 10.

At 1610, the method may include receiving, via the user interface, a data input within an input field of the set of input fields, wherein the input field corresponds to a first column or to a first row of the data table. The operations of 1610 may be performed in accordance with examples as disclosed herein. In some examples, aspects of the operations of 1610 may be performed by a data input component 1030 as described with reference to FIG. 10.

At 1615, the method may include receiving, via the user interface, an applicability indication for the data input, wherein the applicability indication indicates that the data input is applicable to a subset of the rows or a subset of the columns. The operations of 1615 may be performed in accordance with examples as disclosed herein. In some examples, aspects of the operations of 1615 may be performed by an applicability indication component 1035 as described with reference to FIG. 10.

At 1620, the method may include applying multiple instances of the data input to the data table based at least in part on receiving the data input within the input field and the applicability indication, wherein respective instances of the data input are applied to only the subset of the rows within the first column or to only the subset of the columns within the first row. The operations of 1620 may be performed in accordance with examples as disclosed herein. In some examples, aspects of the operations of 1620 may be performed by a fast fill application component 1040 as described with reference to FIG. 10.

At 1625, the method may include generating, after applying the multiple instances of the data input to the data table, a display showing the data table with entries matching the data input in the subset of the rows within the first column or the subset of the columns within the first row. The operations of 1625 may be performed in accordance with examples as disclosed herein. In some examples, aspects of the operations of 1625 may be performed by a display generation component 1050 as described with reference to FIG. 10.

A method for data input via a user interface is described. The method may include providing, at the user interface, a set of input fields corresponding to respective columns or to respective rows of a data table, wherein the data table comprises rows and columns, receiving, via the user interface, a data input within an input field of the set of input fields, wherein the input field corresponds to a first column or to a first row of the data table, receiving, via the user interface, an applicability indication for the data input, wherein the applicability indication indicates that the data input is applicable to a subset of the rows or a subset of the columns, and applying multiple instances of the data input to the data table based at least in part on receiving the data input within the input field and the applicability indication, wherein respective instances of the data input are applied to only the subset of the rows within the first column or to only the subset of the columns within the first row.

An apparatus for data input via a user interface is described. The apparatus may include a processor, memory coupled with the processor, and instructions stored in the memory. The instructions may be executable by the processor to cause the apparatus to provide, at the user interface, a set of input fields corresponding to respective columns or to respective rows of a data table, wherein the data table comprises rows and columns, receive, via the user interface, a data input within an input field of the set of input fields, wherein the input field corresponds to a first column or to a first row of the data table, receive, via the user interface, an applicability indication for the data input, wherein the applicability indication indicates that the data input is applicable to a subset of the rows or a subset of the columns, and apply multiple instances of the data input to the data table based at least in part on receiving the data input within the input field and the applicability indication, wherein respective instances of the data input are applied to only the subset of the rows within the first column or to only the subset of the columns within the first row.

Another apparatus for data input via a user interface is described. The apparatus may include means for providing, at the user interface, a set of input fields corresponding to respective columns or to respective rows of a data table, wherein the data table comprises rows and columns, means for receiving, via the user interface, a data input within an input field of the set of input fields, wherein the input field corresponds to a first column or to a first row of the data table, means for receiving, via the user interface, an applicability indication for the data input, wherein the applicability indication indicates that the data input is applicable to a subset of the rows or a subset of the columns, and means for applying multiple instances of the data input to the data table based at least in part on receiving the data input within the input field and the applicability indication, wherein respective instances of the data input are applied to only the subset of the rows within the first column or to only the subset of the columns within the first row.

A non-transitory computer-readable medium storing code for data input via a user interface is described. The code may include instructions executable by a processor to provide, at the user interface, a set of input fields corresponding to respective columns or to respective rows of a data table, wherein the data table comprises rows and columns, receive, via the user interface, a data input within an input field of the set of input fields, wherein the input field corresponds to a first column or to a first row of the data table, receive, via the user interface, an applicability indication for the data input, wherein the applicability indication indicates that the data input is applicable to a subset of the rows or a subset of the columns, and apply multiple instances of the data input to the data table based at least in part on receiving the data input within the input field and the applicability indication, wherein respective instances of the data input are applied to only the subset of the rows within the first column or to only the subset of the columns within the first row.

In some examples of the method, apparatuses, and non-transitory computer-readable medium described herein, the applicability indication comprises a user input indicating the subset of the rows or the subset of the columns for which the data input may be applicable.

In some examples of the method, apparatuses, and non-transitory computer-readable medium described herein, the applicability indication comprises one or more filtering criteria associated with a second column or second row of the data table.

In some examples of the method, apparatuses, and non-transitory computer-readable medium described herein, operations, features, means, or instructions for applying the multiple instances of the data input to the data table based at least in part on receiving the data input within the input field and the applicability indication may include operations, features, means, or instructions for identifying, within the second column or the second row of the data table, entries that satisfy the one or more filtering criteria and applying, within the first column or the first row, instances of the data input to rows or columns comprising the entries that satisfy the one or more filtering criteria.

In some examples of the method, apparatuses, and non-transitory computer-readable medium described herein, the rows of the data table correspond to respective virtual machines of a set of virtual machines, the columns of the data table correspond to respective configuration parameters for the set of virtual machines, and operations, features, means, or instructions for applying the multiple instances of the data input to the data table may include operations, features, means, or instructions for entering, for virtual machines corresponding to the subset of the rows, a common value for a configuration parameter corresponding to the first column.

In some examples of the method, apparatuses, and non-transitory computer-readable medium described herein, the respective configuration parameters comprise a target network, an internet protocol (IP) configuration, and IP address, an IP netmask, one or more domain name system (DNS) servers, gateway information, or any combination thereof.

Some examples of the method, apparatuses, and non-transitory computer-readable medium described herein may further include operations, features, means, or instructions for identifying the rows of the data table or the columns of the data table and autogenerating the set of input fields based at least in part on identifying the rows of the data table or the columns of the data table.

In some examples of the method, apparatuses, and non-transitory computer-readable medium described herein, at least two rows within the subset of rows or at least two columns within the subset of columns may be non-consecutive.

Some examples of the method, apparatuses, and non-transitory computer-readable medium described herein may further include operations, features, means, or instructions for receiving, via the user interface, an additional data input within an additional input field of the set of input fields, wherein the additional input field corresponds to a different column or to a different row of the data table, and wherein the applicability indication indicates that the additional data input may be applicable to the subset of the rows or the subset of the columns and applying multiple instances of the additional data input to the data table based at least in part on receiving the additional data input within the additional input field and the applicability indication, wherein respective instances of the additional data input may be applied to only the subset of the rows within the different column or to only the subset of the columns within the different row.

Some examples of the method, apparatuses, and non-transitory computer-readable medium described herein may further include operations, features, means, or instructions for receiving, via the user interface after applying the multiple instances of the data input to the data table, a second data input within the input field of the set of input fields, receiving, via the user interface, a second applicability indication for the second data input, wherein the second applicability indication indicates that the second data input may be applicable to a second subset of the rows or a second subset of the columns, and applying multiple instances of the second data input to the data table based at least in part on receiving the second data input within the input field and the second applicability indication, wherein respective instances of the second data input may be applied to only the second subset of the rows within the first column or to only the second subset of the columns within the first row.

Some examples of the method, apparatuses, and non-transitory computer-readable medium described herein may further include operations, features, means, or instructions for generating, after applying the multiple instances of the data input to the data table, a display showing the data table with entries matching the data input in the subset of the rows within the first column or the subset of the columns within the first row.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
providing, at a user interface that is separate from a data table, a set of input fields corresponding to respective columns or to respective rows of the data table, wherein the data table comprises rows and columns;
receiving, via the user interface, a single data input value within an input field of the set of input fields, wherein the input field corresponds to a first column or to a first row of the data table;
receiving, via the user interface, an applicability indication for the single data input value, wherein the applicability indication indicates that the single data input value is applicable to multiple destination locations within the data table, the multiple destination locations within a subset of the rows or a subset of the columns; and
applying multiple instances of the single data input value to the multiple destination locations within the data table based at least in part on receiving the single data input value within the input field and the applicability indication, wherein respective instances of the single data input value are applied to only the subset of the rows within the first column or to only the subset of the columns within the first row.

2. The method of claim 1, wherein the applicability indication comprises a user input indicating the subset of the rows or the subset of the columns associated with the multiple destination locations for which the single data input value is applicable.

3. The method of claim 1, wherein the applicability indication comprises one or more filtering criteria associated with a second column or second row of the data table.

4. The method of claim 3, wherein applying the multiple instances of the single data input value to the multiple destination locations within the data table based at least in part on receiving the single data input value within the input field and the applicability indication comprises:
identifying, within the second column or the second row of the data table, entries that satisfy the one or more filtering criteria; and
applying, within the first column or the first row, instances of the single data input value to rows or columns comprising the entries that satisfy the one or more filtering criteria.

5. The method of claim 1, wherein:
the rows of the data table correspond to respective virtual machines of a set of virtual machines;
the columns of the data table correspond to respective configuration parameters for the set of virtual machines; and
applying the multiple instances of the single data input value to the multiple destination locations within the data table comprises entering, for virtual machines corresponding to the subset of the rows, a common value for a configuration parameter corresponding to the first column.

6. The method of claim 5, wherein the respective configuration parameters comprise a target network, an internet protocol (IP) configuration, and IP address, an IP netmask, one or more domain name system (DNS) servers, gateway information, or any combination thereof.

7. The method of claim 1, further comprising:
identifying the rows of the data table or the columns of the data table; and
autogenerating the set of input fields based at least in part on identifying the rows of the data table or the columns of the data table.

8. The method of claim 1, wherein at least two rows within the subset of the rows or at least two columns within the subset of the columns are non-consecutive.

9. The method of claim 1, further comprising:
receiving, via the user interface, an additional single data input value within an additional input field of the set of input fields, wherein the additional input field corresponds to a different column or to a different row of the data table, and wherein the applicability indication indicates that the additional single data input value is applicable to multiple additional destination locations within the data table, the multiple additional destination locations within the subset of the rows or the subset of the columns; and
applying multiple instances of the additional single data input value to the multiple additional destination locations within the data table based at least in part on receiving the additional single data input value within the additional input field and the applicability indication, wherein respective instances of the additional single data input value are applied to only the subset of the rows within the different column or to only the subset of the columns within the different row.

10. The method of claim 1, further comprising:
receiving, via the user interface after applying the multiple instances of the single data input value to the multiple destination locations within the data table, a second single data input value within the input field of the set of input fields;

receiving, via the user interface, a second applicability indication for the second single data input value, wherein the second applicability indication indicates that the second single data input value is applicable to multiple second destination locations within the data table, the multiple second destination locations within a second subset of the rows or a second subset of the columns; and applying multiple instances of the second single data input value to the multiple second destination locations within the data table based at least in part on receiving the second single data input value within the input field and the second applicability indication, wherein respective instances of the second single data input value are applied to only the second subset of the rows within the first column or to only the second subset of the columns within the first row.

11. The method of claim 1, further comprising:
generating, after applying the multiple instances of the single data input value to the multiple destination locations within the data table, a display showing the data table with entries matching the single data input value in the subset of the rows within the first column or the subset of the columns within the first row.

12. An apparatus, comprising:
one or more processors;
one or more memories coupled with the one or more processors; and
instructions stored in the one or more memories and executable by the one or more processors to cause the apparatus to:
provide, at a user interface that is separate from a data table, a set of input fields corresponding to respective columns or to respective rows of the data table, wherein the data table comprises rows and columns;
receive, via the user interface, a single data input value within an input field of the set of input fields, wherein the input field corresponds to a first column or to a first row of the data table;
receive, via the user interface, an applicability indication for the single data input value, wherein the applicability indication indicates that the single data input value is applicable to multiple destination locations within the data table, the multiple destination locations within a subset of the rows or a subset of the columns; and
apply multiple instances of the single data input value to the multiple destination locations within the data table based at least in part on receiving the single data input value within the input field and the applicability indication, wherein respective instances of the single data input value are applied to only the subset of the rows within the first column or to only the subset of the columns within the first row.

13. The apparatus of claim 12, wherein the applicability indication comprises a user input indicating the subset of the rows or the subset of the columns associated with the multiple destination locations for which the single data input value is applicable.

14. The apparatus of claim 12, wherein the applicability indication comprises one or more filtering criteria associated with a second column or second row of the data table.

15. The apparatus of claim 14, wherein the instructions to apply the multiple instances of the single data input value to the multiple destination locations within the data table based at least in part on receiving the single data input value within the input field and the applicability indication are executable by the one or more processors to cause the apparatus to:
identify, within the second column or the second row of the data table, entries that satisfy the one or more filtering criteria; and
apply, within the first column or the first row, instances of the single data input value to rows or columns comprising the entries that satisfy the one or more filtering criteria.

16. The apparatus of claim 12, wherein:
the rows of the data table correspond to respective virtual machines of a set of virtual machines;
the columns of the data table correspond to respective configuration parameters for the set of virtual machines; and
the instructions to apply the multiple instances of the single data input value to the multiple destination locations within the data table are executable by the one or more processors to cause the apparatus to enter, for virtual machines corresponding to the subset of the rows, a common value for a configuration parameter corresponding to the first column.

17. The apparatus of claim 12, wherein the instructions are further executable by the one or more processors to cause the apparatus to:
identify the rows of the data table or the columns of the data table; and
autogenerate the set of input fields based at least in part on identifying the rows of the data table or the columns of the data table.

18. The apparatus of claim 12, wherein the instructions are further executable by the one or more processors to cause the apparatus to:
receive, via the user interface, an additional single data input value within an additional input field of the set of input fields, wherein the additional input field corresponds to a different column or to a different row of the data table, and wherein the applicability indication indicates that the additional single data input value is applicable to multiple additional destination locations within the data table, the multiple additional destination locations within the subset of the rows or the subset of the columns; and
apply multiple instances of the additional single data input value to the multiple additional destination locations within the data table based at least in part on receiving the additional single data input value within the additional input field and the applicability indication, wherein respective instances of the additional single data input value are applied to only the subset of the rows within the different column or to only the subset of the columns within the different row.

19. The apparatus of claim 12, wherein the instructions are further executable by the one or more processors to cause the apparatus to:
receive, via the user interface after applying the multiple instances of the single data input value to the multiple destination locations within the data table, a second single data input value within the input field of the set of input fields;
receive, via the user interface, a second applicability indication for the second single data input value, wherein the second applicability indication indicates that the second single data input value is applicable to multiple second destination locations within the data table, the multiple second destination locations within a second subset of the rows or a second subset of the columns; and apply multiple instances of the second single data input value to the multiple second destination locations within the data table based at least in part on receiving the second single data input value within the input field and the second applicability indication, wherein respective instances of the second single data input value are applied to only the second subset of the rows within the first column or to only the second subset of the columns within the first row.

20. A non-transitory computer-readable medium storing code, the code comprising instructions executable by one or more processors to:

provide, at a user interface that is separate from a data table, a set of input fields corresponding to respective columns or to respective rows of the data table, wherein the data table comprises rows and columns;

receive, via the user interface, a single data input value within an input field of the set of input fields, wherein the input field corresponds to a first column or to a first row of the data table;

receive, via the user interface, an applicability indication for the single data input value, wherein the applicability indication indicates that the single data input value is applicable to multiple destination locations within the data table, the multiple destination locations within a subset of the rows or a subset of the columns; and apply multiple instances of the single data input value to the multiple destination locations within the data table based at least in part on receiving the single data input value within the input field and the applicability indication, wherein respective instances of the single data input value are applied to only the subset of the rows within the first column or to only the subset of the columns within the first row.

* * * * *